US008015355B1

(12) United States Patent
Smith et al.

(10) Patent No.: US 8,015,355 B1
(45) Date of Patent: Sep. 6, 2011

(54) SYSTEM AND METHOD FOR MANAGING HARD LOCK STATE INFORMATION IN A DISTRIBUTED STORAGE SYSTEM ENVIRONMENT

(75) Inventors: Toby Smith, Pittsburgh, PA (US); Richard P. Jernigan, IV, Ambridge, PA (US); Robert Wyckoff Hyer, Jr., Mars, PA (US); Michael Kazar, Pittsburgh, PA (US); David B. Noveck, Lexington, MA (US); Peter Griess, San Francisco, CA (US)

(73) Assignee: NetApp, Inc., Sunnyvale, CA (US)

( * ) Notice: Subject to any disclaimer, the term of this patent is extended or adjusted under 35 U.S.C. 154(b) by 7 days.

(21) Appl. No.: 12/535,930

(22) Filed: Aug. 5, 2009

(51) Int. Cl.
G06F 12/14 (2006.01)

(52) U.S. Cl. .......................... 711/114; 711/150; 711/152

(58) Field of Classification Search .......................... None
See application file for complete search history.

(56) References Cited

U.S. PATENT DOCUMENTS

| 5,619,691 A | 4/1997 | Katada et al. |
| 5,819,292 A | 10/1998 | Hitz et al. |
| 6,032,216 A | 2/2000 | Schmuck et al. |
| 6,219,751 B1 | 4/2001 | Hodges |
| 6,502,166 B1 | 12/2002 | Cassidy |
| 6,556,998 B1 | 4/2003 | Mukherjee et al. |
| 6,564,252 B1 | 5/2003 | Hickman et al. |
| 6,671,773 B2 | 12/2003 | Kazar et al. |
| 6,970,872 B1 | 11/2005 | Chandrasekaran et al. |
| 7,159,093 B2 | 1/2007 | Dalal et al. |
| 7,185,144 B2 | 2/2007 | Corbett et al. |
| 7,302,520 B2 | 11/2007 | Kazar et al. |
| 7,352,612 B2 | 4/2008 | Hamberg et al. |
| 7,409,494 B2 | 8/2008 | Edwards et al. |
| 7,587,558 B1 * | 9/2009 | Smith et al. .................... 711/152 |
| 7,730,258 B1 | 6/2010 | Smith et al. |
| 2003/0188045 A1 | 10/2003 | Jacobson |
| 2003/0221124 A1 | 11/2003 | Curran et al. |
| 2004/0133652 A1 | 7/2004 | Miloushev et al. |
| 2004/0139167 A1 | 7/2004 | Edsall et al. |
| 2005/0015384 A1 | 1/2005 | Wehrman et al. |
| 2005/0149683 A1 * | 7/2005 | Chong et al. .................... 711/162 |
| 2005/0192932 A1 | 9/2005 | Kazar et al. |
| 2006/0184731 A1 | 8/2006 | Corbett et al. |
| 2006/0248088 A1 | 11/2006 | Kazar et al. |
| 2007/0094466 A1 * | 4/2007 | Sharma et al. ................. 711/162 |

FOREIGN PATENT DOCUMENTS

JP 10003440 6/1998

(Continued)

OTHER PUBLICATIONS

Brinkmann, A., et al., "Efficient, Distributed Data Placement Strategies for Storage Area Networks" XP-002404501, 10 pages.

(Continued)

*Primary Examiner* — Than Nguyen
(74) *Attorney, Agent, or Firm* — Cesari and McKenna, LLP

(57) ABSTRACT

Apparatus and method are disclosed for managing lock state information in a distributed file system. A set of data containers storing data is maintained. The data containers are striped across a plurality of volumes, where each volume includes one or more data storage devices. A metadata volume is maintained with the plurality of volumes, the metadata volume configured to include a lock state database that stores lock state information for the plurality of volumes. The lock state information is communicated between the metadata volume and the plurality of volumes.

27 Claims, 17 Drawing Sheets

FOREIGN PATENT DOCUMENTS

WO      WO 00/07101      2/2000

OTHER PUBLICATIONS

Ganger, Gregory R., et al., "Disk Subsystem Load Balancing: Disk Striping vs. Conventional Data Placement" Department of Electrical Engineering and Computer Science, University of Michigan, Ann Arbor, 10 pages.

Hartman, J. H., et al., "Zebra: A Striped Network File System" Proceedings of the Usenix File Systems Workshop, Apr. 1998 pp. 1-9, XP002926950.

Hartman, J. H., et al., "The Zebra Striped Network File System" Dec. 1, 1993, Operating Systems Review, ACM, New York, NY, US, pp. 29-43, XP000418681, Issn: 0163-5908.

Network Appliance, Inc., Notification of Transmittal of the International Search Report and the Written Opinion of the International Searching Authority, or the Declaration, International Application No. PCT/US2005/030889, International Filing Date: Aug. 31, 2005, Date of Mailing of Document: Jan. 13, 2006, 7 pages.

Network Appliance, Inc., Notification of Transmittal of the International Search Report and the Written Opinion of the International Searching Authority, or the Declaration, International Application No. PCT/US2006/016055, International Filing Date: Apr. 27, 2006, Date of Mailing of Document: Nov. 9, 2006, 10 pages.

Ho, T. K., et al., "A Row Permutated Data Reorganization Algorithm for Growing Server-Less Video-On-Demand Systems", Department of Information Engineering, The Chinese University of Hong Kong, Shatin, N.T., Hong Kong, May 12, 2003, 8 pages.

Honicky, R. J., et al., "A Fast Algorithm for Online Placement and Reorganization of Replicated Data", Storage Systems Research Center, University of California, Santa Cruz, Apr. 22, 2003, 10 pages.

Simitci, H., et al., "Adaptive disk striping for Parallel Input/output" Mass Storage Systems, 1999. 16th IEEE Symposium on San Diego, CA, USA, Mar. 15-18, 1999, Piscataway, NJ, USA, IEEE, US, Mar. 15, 1999, pp. 88-102, XP010376289.

Shinkai, E., et al., "HAMFS File System" Reliable distributed systems, 1999. Proceedings of the 18th IEEE Symposium on Lausanne, Switzerland, Oct. 19-22, 1999, Los Alamitos, CA, USA, IEEE Comput. Soc., US, Oct. 19, 1999, pp. 190-201, XP010356993.

* cited by examiner

400 ⬉

| CF PROTOCOL | 410 |
| RC | 408 |
| UDP | 406 |
| IP | 404 |
| MEDIA ACCESS | 402 |

| SVS ID 502 | INODE NUMBER 504 | UNIQUE-IFIER 506 | STRIPED FLAG 508 | STRIPING EPOCH NUMBER 510 |

FIG. 5

SYSTEM AND METHOD FOR MANAGING HARD LOCK STATE INFORMATION IN A DISTRIBUTED STORAGE SYSTEM ENVIRONMENT

CROSS-REFERENCE TO RELATED APPLICATION

The present application claims the benefit of U.S. patent application Ser. No. 11/264,831, filed on Nov. 1, 2005 by Toby Smith et al., titled SYSTEM AND METHOD FOR MANAGING HARD LOCK STATE INFORMATION IN A DISTRIBUTED STORAGE SYSTEM ENVIRONMENT, now issued as U.S. Pat. No. 7,587,558 on Sep. 8, 2009.

The present application is also related to U.S. patent application Ser. No. 11/591,738, filed on Nov. 2, 2006 by Toby Smith et al., titled SYSTEM AND METHOD FOR MANAGING HARD AND SOFT LOCK STATE INFORMATION IN A DISTRIBUTED STORAGE SYSTEM ENVIRONMENT, now issued as U.S. Pat. No. 7,730,258 on Jun. 1, 2010.

FIELD OF THE INVENTION

The present invention relates to a distributed cluster computer environment and, more particularly, to managing lock information in such an environment.

BACKGROUND INFORMATION

A storage system typically comprises one or more storage devices into which information may be entered, and from which information may be obtained, as desired. The storage system includes a storage operating system that functionally organizes the system by, inter alia, invoking storage operations in support of a storage service implemented by the system. The storage system may be implemented in accordance with a variety of storage architectures including, but not limited to, a network-attached storage environment, a storage area network and a disk assembly directly attached to a client or host computer. The storage devices are typically disk drives organized as a disk array, wherein the term "disk" commonly describes a self-contained rotating magnetic media storage device. The term disk in this context is synonymous with hard disk drive (HDD) or direct access storage device (DASD).

The storage operating system of the storage system may implement a high-level module, such as a file system, to logically organize the information stored on volumes as a hierarchical structure of data containers, such as files and logical units. For example, each "on-disk" file may be implemented as set of data structures, i.e., disk blocks, configured to store information, such as the actual data for the file. These data blocks are organized within a volume block number (vbn) space that is maintained by the file system. The file system may also assign each data block in the file a corresponding "file offset" or file block number (fbn). The file system typically assigns sequences of fbns on a per-file basis, whereas vbns are assigned over a larger volume address space. The file system organizes the data blocks within the vbn space as a "logical volume"; each logical volume may be, although is not necessarily, associated with its own file system.

A known type of file system is a write-anywhere file system that does not overwrite data on disks. If a data block is retrieved (read) from disk into a memory of the storage system and "dirtied" (i.e., updated or modified) with new data, the data block is thereafter stored (written) to a new location on disk to optimize write performance. A write-anywhere file system may initially assume an optimal layout such that the data is substantially contiguously arranged on disks. The optimal disk layout results in efficient access operations, particularly for sequential read operations, directed to the disks. An example of a write-anywhere file system that is configured to operate on a storage system is the Write Anywhere File Layout (WAFL®) file system available from Network Appliance, Inc., Sunnyvale, Calif.

The storage system may be further configured to operate according to a client/server model of information delivery to thereby allow many clients to access data containers stored on the system. In this model, the client may comprise an application, such as a database application, executing on a computer that "connects" to the storage system over a computer network, such as a point-to-point link, shared local area network (LAN), wide area network (WAN), or virtual private network (VPN) implemented over a public network such as the Internet. Each client may request the services of the storage system by issuing file-based and block-based protocol messages (in the form of packets) to the system over the network.

A plurality of storage systems may be interconnected to provide a storage system environment configured to service many clients. Each storage system may be configured to service one or more volumes, wherein each volume stores one or more data containers. Yet often a large number of data access requests issued by the clients may be directed to a small number of data containers serviced by a particular storage system of the environment. A solution to such a problem is to distribute the volumes serviced by the particular storage system among all of the storage systems of the environment. This, in turn, distributes the data access requests, along with the processing resources needed to service such requests, among all of the storage systems, thereby reducing the individual processing load on each storage system. However, a noted disadvantage arises when only a single data container, such as a file, is heavily accessed by clients of the storage system environment. As a result, the storage system attempting to service the requests directed to that data container may exceed its processing resources and become overburdened, with a concomitant degradation of speed and performance.

One technique for overcoming the disadvantages of having a single data container that is heavily utilized is to stripe the data container across a plurality of volumes configured as a striped volume set (SVS), where each volume is serviced by a different storage system, thereby distributing the load for the single data container among a plurality of storage systems. A technique for data container striping is described in U.S. Pat. No. 7,698,289, issued on Apr. 13, 2010, entitled STORAGE SYSTEM ARCHITECTURE FOR STRIPING DATA CONTAINER CONTENT ACROSS VOLUMES OF A CLUSTER, by Kazar et al. In such an environment, a SVS comprises one or more data volumes (DV) and a meta-data volume (MDV). Each DV and the MDV is typically served by a separate node of the distributed storage system environment. In the environment described in the above-incorporated U.S. Patent Application, the node may comprise a network element (N-module) and a disk element (D-module) that includes a file system. As used herein a D-module serving (hosting) a DV is referred to as a "DV node", while a D-module hosting the MDV for a SVS is referred to as a "MDV node."

Most file access protocols include locking capabilities. A lock is a mechanism that enables a client or system administrator to prevent access to a shared resource. An entity later attempting to access this shared resource will be notified of the exclusive lock, which prevents others from accessing the resource. The types of locks can vary, for example, in some instances, there may be a write lock placed on a resource by the owner, yet other entities may be able to obtain read access to the resource. The type of lock, and/or the absence of a lock over a particular data container, such as a file, or portion thereof are referred to herein as a "lock state."

Various challenges arise with respect to managing lock state information regarding a distributed storage system. The volume of lock state information can be potentially large and subject to constant change as information is updated and edited.

Known techniques for managing lock state information include an approach in which lock state information is distributed directly to end clients. In this case, clients and/or end users utilize specific lock state management software applications and special protocols that allow the users to create, edit and manage lock state information.

Another approach stores lock state information in a central repository for the entire system; however, this centralized approach can result in a bottleneck for file access in a large, distributed system. Thus, a need arises to decentralize, yet control lock state information while maintaining the ability to rapidly update this information on the distributed storage system without requiring users to run specialized software programs.

SUMMARY OF THE INVENTION

The present invention overcomes the disadvantages of the prior art by providing a technique for managing lock state information in a distributed storage system architecture comprising two or more volumes distributed across a plurality of nodes interconnected as a cluster. The volumes are organized as one or more striped volume sets (SVS) and configured to store content of data containers, such as files and logical units, served by the cluster in response to multi-protocol data access requests issued by clients. Each node of the cluster includes (i) a storage server adapted to service a volume of a SVS and (ii) a multi-protocol engine adapted to redirect the data access requests to any storage server of the cluster. Notably, the content of each data container is apportioned among the volumes of the SVS to thereby improve the efficiency of storage service provided by the cluster.

According to the invention, a lock manager is configured to efficiently manage the lock state information, including granting, revoking and releasing of various types of locks on data containers or ranges of data containers stored on the SVS. Illustratively, the lock manager functions, inter alia, to manage lock state information including hard lock state information. As used herein, "hard locks" are client requested locks which are mandatory and cannot be ignored by other clients. Such locks are also known to those is skilled in the art as "mandatory locks." These are in contrast to advisory locks or soft locks which let the owner of the lock watch a portion or particular range of a file or data container for conflicting activity.

In the distributed storage system, each SVS comprises a meta-data volume (MDV) configured to store a canonical copy of meta-data, including access control lists and directories, associated with all data containers stored on the SVS, and one or more data volumes (DV) configured to store, at least, data content of those containers. Notably, the MDV (the "MDV node") also functions as the authoritative source for all lock state information for all data containers on the SVS. To that end, the lock manager configures and maintains a lock state database on the MDV that contains the lock state information for the SVS. Client requests for access to particular data containers or portions of data containers are directed to and processed by the MDV node and the resulting lock state information is provided to the DVs ("DV nodes) for storage on local lock caches on the DV nodes.

In accordance with a further aspect of the invention novel lock state command messages are provided to convey lock state information between the MDV node and the individual DV nodes. For example, when a DV node receives a data container access request from a client, it will check its own local lock cache. If that local lock cache does not contain relevant lock state information for the pending request, the DV node sends a command/query in accordance with a lock state message to the MDV node and the MDV node responds with appropriate lock state information regarding conflicting locks, if any. The MDV node maintains a record of lock state information that it has sent to each DV node so that the MDV node can subsequently update the appropriate DV node regarding lock states that have been purged or changed, for example. The DV nodes can then allow or deny access requests accordingly.

In accordance with another aspect of the invention, the lock states are further managed using designations called "permissive areas" that are used to propagate implicit lock state information from the MDV node to the DV nodes. A permissive area, as used herein, is a lock, similar to a client-requested lock, but the permissive area lock is established by the MDV node in order to fulfill a request for a DV node. Moreover, permissive areas are revoked automatically when a new client-requested lock would conflict with the permissive area. As with a client requested lock, a permissive area could span either an entire data container or simply a portion of one. If a predefined length is not available due to other existing locks, then the amount of the data container that is available is assigned. If a sufficient amount is not available, the request is denied.

BRIEF DESCRIPTION OF THE DRAWINGS

The above and further advantages of the present invention may be better understood by referring to the following description in conjunction with the accompanying drawings, in which like reference numerals indicate identical or functionally similar elements:

FIG. 4 is a schematic block diagram illustrating the format of a cluster fabric (CF) message in accordance with an illustrative embodiment of the present invention;

FIG. 5 is a schematic block diagram illustrating the format of a data container handle in accordance with an illustrative embodiment of the present invention;

DETAILED DESCRIPTION OF AN ILLUSTRATIVE EMBODIMENT

A. Cluster Environment

Figure 1:
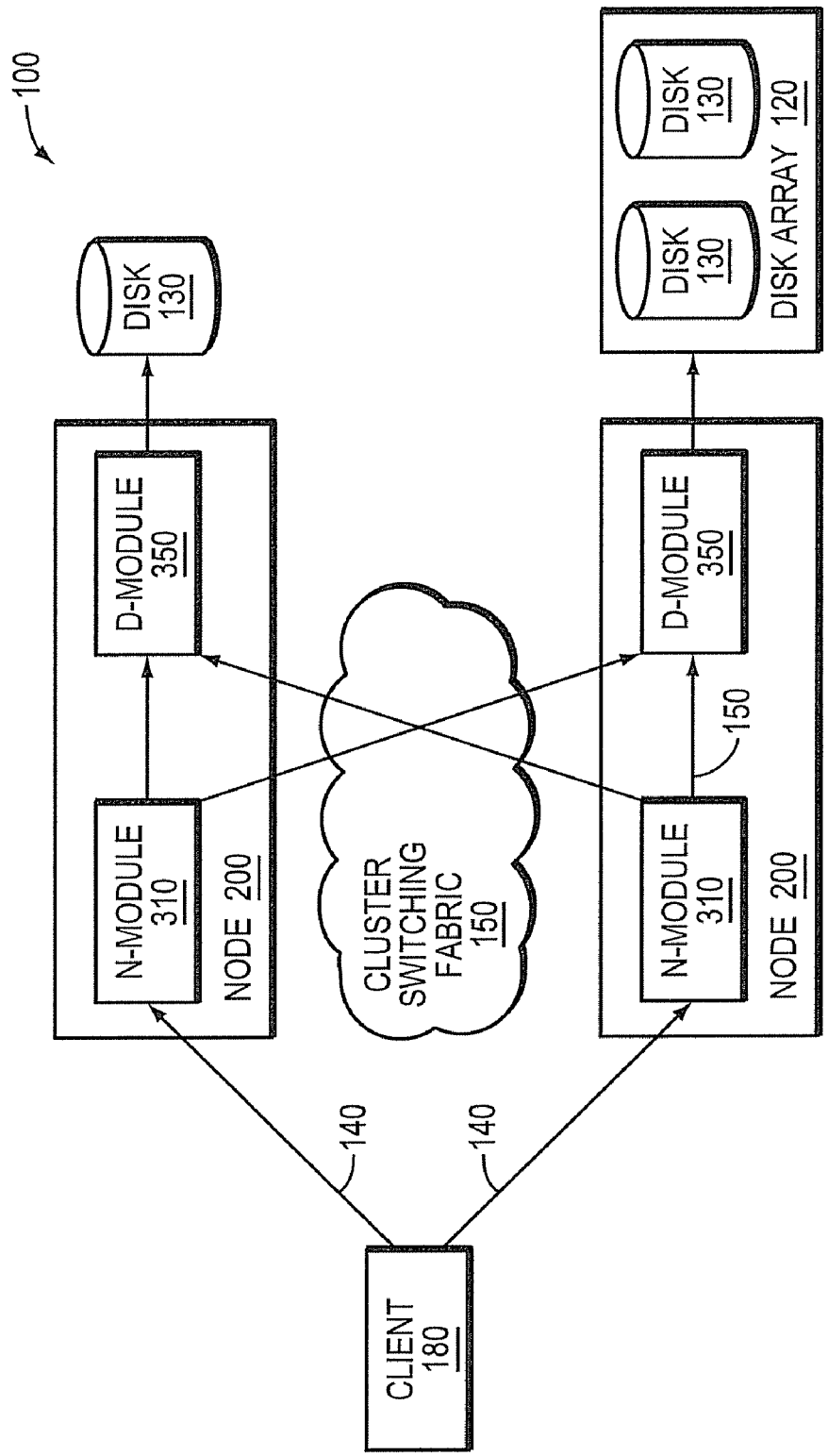
FIG. 1 is a schematic block diagram of a plurality of nodes interconnected as a cluster in accordance with an illustrative embodiment of the present invention.

FIG. 1 is a schematic block diagram of a plurality of nodes 200 interconnected as a cluster 100 and configured to provide storage service relating to the organization of information on storage devices. The nodes 200 comprise various functional components that cooperate to provide a distributed storage system architecture of the cluster 100. To that end, each node 200 is generally organized as a network element (N-module 310) and a disk element (D-module 350). The N-module 310 includes functionality that enables the node 200 to connect to clients 180 over a computer network 140, while each D-module 350 connects to one or more storage devices, such as disks 130 of a disk array 120. The nodes 200 are interconnected by a cluster switching fabric 150 which, in the illustrative embodiment, may be embodied as a Gigabit Ethernet switch. The exemplary distributed file system architecture is generally described in U.S. Pat. No. 6,671,773 titled METHOD AND SYSTEM FOR RESPONDING TO FILE SYSTEM REQUESTS, by M. Kazar et al., issued on Dec. 30, 2003. It should be noted that while there is shown an equal number of N and D-modules in the illustrative cluster 100, there may be differing numbers of N and/or D-modules in accordance with various embodiments of the present invention. For example, there may be a plurality of N-modules and/or D-modules interconnected in a cluster configuration 100 that does not reflect a one-to-one correspondence between the N and D-modules. As such, the description of a node 200 comprising one N-module and one D-module should be taken as illustrative only. In an alternate embodiment, each N or D-module in a distributed storage system environment may be referred to as a node of such environment.

The clients 180 may be general-purpose computers configured to interact with the node 200 in accordance with a client/server model of information delivery. That is, each client may request the services of the node, and the node may return the results of the services requested by the client, by exchanging packets over the network 140. The client may issue packets including file-based access protocols, such as the Common Internet File System (CIFS) protocol or Network File System (NFS) protocol, over the Transmission Control Protocol/Internet Protocol (TCP/IP) when accessing information in the form of files and directories. Alternatively, the client may issue packets including block-based access protocols, such as the Small Computer Systems Interface (SCSI) protocol encapsulated over TCP/IP (iSCSI) and SCSI encapsulated over Fibre Channel (FCP), when accessing information in the form of blocks.

B. Storage System Node

Figure 2:
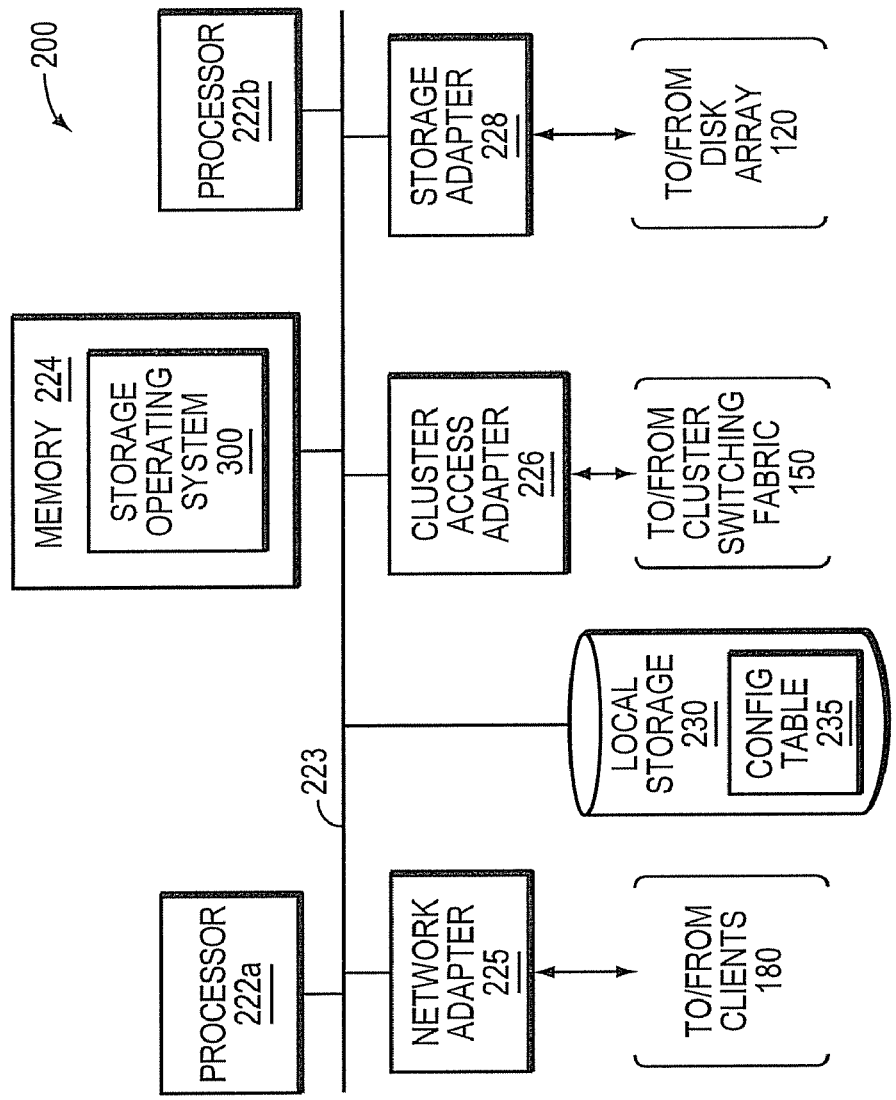
FIG. 2 is a schematic block diagram of a node in accordance with an illustrative embodiment of the present invention.

FIG. 2 is a schematic block diagram of an exemplary node 200 that is illustratively embodied as a storage system comprising a plurality of processors 222a,b, a memory 224, a network adapter 225, a cluster access adapter 226, a storage adapter 228 and local storage 230 interconnected by a system bus 223. The local storage 230 comprises one or more storage devices, such as disks, utilized by the node to locally store configuration information (e.g., in configuration table 235). The cluster access adapter 226 comprises a plurality of ports adapted to couple the node 200 to other nodes of the cluster 100. In the illustrative embodiment, Ethernet is used as the clustering protocol and interconnect media, although it will be apparent to those skilled in the art that other types of protocols and interconnects may be utilized within the cluster architecture described herein. In alternate embodiments where the N-modules and D-modules are implemented on separate storage systems or computers, the cluster access adapter 226 is utilized by the N/D-module for communicating with other N/D-modules in the cluster 100.

Each node 200 is illustratively embodied as a dual processor storage system executing a storage operating system 300 that preferably implements a high-level module, such as a file system, to logically organize the information as a hierarchical structure of named data containers, such as directories, files and special types of files called virtual disks (hereinafter generally "blocks") on the disks. However, it will be apparent to those of ordinary skill in the art that the node 200 may alternatively comprise a single or more than two processor system. Illustratively, one processor 222a executes the functions of the N-module 310 on the node, while the other processor 222b executes the functions of the D-module 350.

The memory 224 illustratively comprises storage locations that are addressable by the processors and adapters for storing software program code and data structures associated with the present invention. The processor and adapters may, in turn, comprise processing elements and/or logic circuitry configured to execute the software code and manipulate the data structures. The storage operating system 300, portions of which is typically resident in memory and executed by the processing elements, functionally organizes the node 200 by, inter alia, invoking storage operations in support of the storage service implemented by the node. It will be apparent to those skilled in the art that other processing and memory means, including various computer readable media, may be used for storing and executing program instructions pertaining to the invention described herein.

The network adapter 225 comprises a plurality of ports adapted to couple the node 200 to one or more clients 180 over point-to-point links, wide area networks, virtual private networks implemented over a public network (Internet) or a shared local area network. The network adapter 225 thus may comprise the mechanical, electrical and signaling circuitry needed to connect the node to the network. Illustratively, the computer network 140 may be embodied as an Ethernet network or a Fibre Channel (FC) network. Each client 180 may communicate with the node over network 140 by exchanging discrete frames or packets of data according to pre-defined protocols, such as TCP/IP.

The storage adapter 228 cooperates with the storage operating system 300 executing on the node 200 to access information requested by the clients. The information may be stored on any type of attached array of writable storage device media such as video tape, optical, DVD, magnetic tape, bubble memory, electronic random access memory, microelectro mechanical and any other similar media adapted to store information, including data and parity information. However, as illustratively described herein, the information is preferably stored on the disks 130 of array 120. The storage adapter comprises a plurality of ports having input/output (I/O) interface circuitry that couples to the disks over an I/O interconnect arrangement, such as a conventional high-performance, FC link topology.

Storage of information on each array 120 is preferably implemented as one or is more storage "volumes" that comprise a collection of physical storage disks 130 cooperating to define an overall logical arrangement of volume block number (vbn) space on the volume(s). Each logical volume is generally, although not necessarily, associated with its own file system. The disks within a logical volume/file system are typically organized as one or more groups, wherein each group may be operated as a Redundant Array of Independent (or Inexpensive) Disks (RAID). Most RAID implementations, such as a RAID-4 level implementation, enhance the reliability/integrity of data storage through the redundant writing of data "stripes" across a given number of physical disks in the RAID group, and the appropriate storing of parity information with respect to the striped data. An illustrative example of a RAID implementation is a RAID-4 level implementation, although it should be understood that other types and levels of RAID implementations may be used in accordance with the inventive principles described herein.

C. Storage Operating System

To facilitate access to the disks 130, the storage operating system 300 implements a write-anywhere file system that cooperates with one or more virtualization modules to "virtualize" the storage space provided by disks 130. The file system logically organizes the information as a hierarchical structure of named directories and files on the disks. Each "on-disk" file may be implemented as set of disk blocks configured to store information, such as data, whereas the directory may be implemented as a specially formatted file in which names and links to other files and directories are stored. The virtualization module(s) allow the file system to further logically organize information as a hierarchical structure of blocks on the disks that are exported as named logical unit numbers (luns).

In the illustrative embodiment, the storage operating system is preferably the NetApp® Data ONTAP™ operating system available from Network Appliance, Inc., Sunnyvale, Calif. that implements a Write Anywhere File Layout (WAFL®) file system. However, it is expressly contemplated that any appropriate storage operating system may be enhanced for use in accordance with the inventive principles described herein. As such, where the term "ONTAP" is employed, it should be taken broadly to refer to any storage operating system that is otherwise adaptable to the teachings of this invention.

Figure 3:
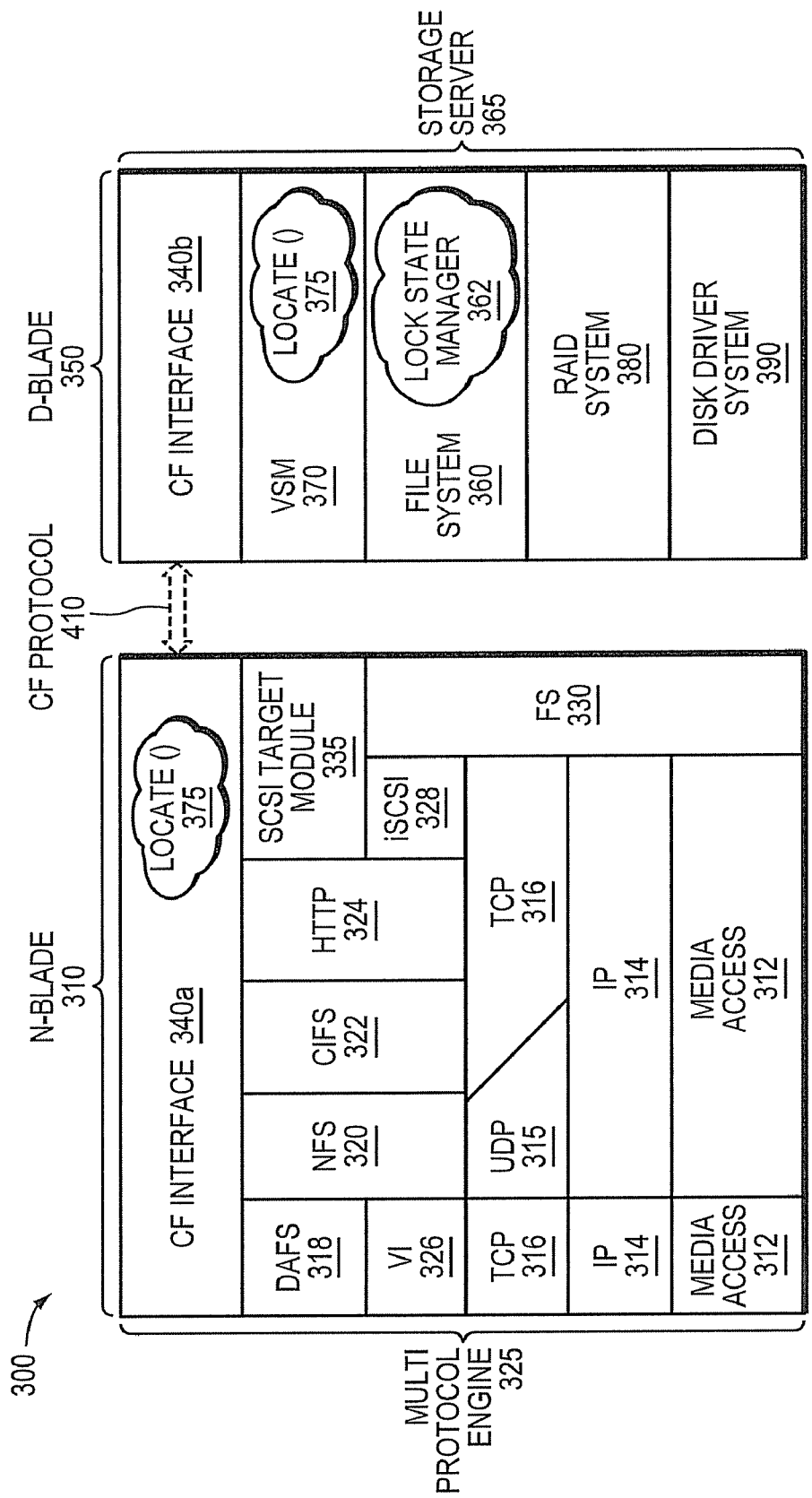
FIG. 3 is a schematic block diagram of a storage operating system that may be advantageously employed with an illustrative embodiment of the present invention.

FIG. 3 is a schematic block diagram of the storage operating system 300 that may be advantageously used with the present invention. The storage operating system comprises a series of software layers organized to form an integrated network protocol stack or, more generally, a multi-protocol engine 325 that provides data paths for clients to access information stored on the node using block and file access protocols. The multi-protocol engine includes a media access layer 312 of network drivers (e.g., gigabit Ethernet drivers) that interfaces to network protocol layers, such as the IP layer 314 and its supporting transport mechanisms, the TCP layer 316 and the User Datagram Protocol (UDP) layer 315. A file system protocol layer provides multi-protocol file access and, to that end, includes support for the Direct Access File System (DAFS) protocol 318, the NFS protocol 320, the CIFS protocol 322 and the Hypertext Transfer Protocol (HTTP) protocol 324. A VI layer 326 implements the VI architecture to provide direct access transport (DAT) capabilities, such as RDMA, as required by the DAFS protocol 318. An iSCSI driver layer 328 provides block protocol access over the TCP/IP network protocol layers, while a FC driver layer 330 receives and transmits block access requests and responses to and from the node. The FC and iSCSI drivers provide FC-specific and iSCSI-specific access control to the blocks and, thus, manage exports of luns to either iSCSI or FCP or, alternatively, to both iSCSI and FCP when accessing the blocks on the node 200.

In addition, the storage operating system includes a series of software layers organized to form a storage server 365 that provides data paths for accessing information stored on the disks 130 of the node 200. To that end, the storage server 365 includes a file system module 360 in cooperating relation with a volume striping module (VSM) 370, a RAID system module 380 and a disk driver system module 390. The RAID system 380 manages the storage and retrieval of information to and from the volumes/disks in accordance with I/O operations, while the disk driver system 390 implements a disk access protocol such as, e.g., the SCSI protocol. The VSM 370 illustratively implements is a striped volume set (SVS). As described further herein, the VSM cooperates with the file system 360 to enable storage server 365 to service a volume of the SVS. In particular, the VSM 370 implements a Locate( ) function 375 to compute the location of data container content in the SVS volume to thereby ensure consistency of such content served by the cluster.

The file system 360 implements a virtualization system of the storage operating system 300 through the interaction with one or more virtualization modules illustratively embodied as, e.g., a virtual disk (vdisk) module (not shown) and a SCSI target module 335. The vdisk module enables access by administrative interfaces, such as a user interface of a management framework (not shown), in response to a user (system administrator) issuing commands to the node 200. The SCSI target module 335 is generally disposed between the FC and iSCSI drivers 328, 330 and the file system 360 to provide a translation layer of the virtualization system between the block (lun) space and the file system space, where luns are represented as blocks.

The file system 360 is illustratively a message-based system that provides logical volume management capabilities for use in access to the information stored on the storage devices, such as disks. That is, in addition to providing file system semantics, the file system 360 provides functions normally associated with a volume manager. These functions include (i) aggregation of the disks, (ii) aggregation of storage bandwidth of the disks, and (iii) reliability guarantees, such as mirroring and/or parity (RAID). The file system 360 illustratively implements the WAFL file system (hereinafter generally the "write-anywhere file system") having an on-disk format representation that is block-based using, e.g., 4 kilobyte (KB) blocks and using index nodes ("inodes") to identify files and file attributes (such as creation time, access permissions, size and block location). The file system uses files to store meta-data describing the layout of its file system; these meta-data files include, among others, an inode file. A file handle, i.e., an identifier that includes an inode number, is used to retrieve an inode from disk.

Broadly stated, all inodes of the write-anywhere file system are organized into the inode file. A file system (fs) info block specifies the layout of information in the file system and includes an inode of a file that includes all other inodes of the file system. Each logical volume (file system) has an fsinfo block that is preferably stored at a fixed location within, e.g., a RAID group. The inode of the inode file may directly reference (point to) data blocks of the inode file or may reference indirect blocks of the inode file that, in turn, reference data blocks of the inode file. Within each data block of the inode file are embedded inodes, each of which may reference indirect blocks that, in turn, reference data blocks of a file.

As described further herein, the file system includes a lock manager process that is configured to efficiently manage lock state information including granting, revoking and releasing of various types of locks on data containers, such as files, stored on the SVS. For example, in response to a file access operation that includes a request for a lock of a particular type, the lock manager 362 decides whether to grant, refuse to grant, or wait for the appropriate time to grant that lock. To that end, the lock manager 362 coordinates share/open requests which provide for locks on an entire file, and range locks that cover a specific byte range within a file. Both share/open locks and range locks are established upon request of the client, who then becomes the owner of the lock. Illustratively, the locks may be removed only by the lock owner. More specifically, the lock manager 362 functions, inter alia, to manage lock state information including hard lock state information. As used herein, "hard locks" are client requested locks which are mandatory and cannot be ignored by other clients, and as noted, can only be removed by the lock owner. Such locks are also known to those skilled in the art as "mandatory locks." These are in contrast to advisory locks or soft locks which let the owner of the lock watch a portion or particular range of a file or data container for conflicting activity.

Operationally, a data access request directed to a data container, such as a file, is issued from a client 180 and forwarded as a packet over the computer network 140 to the node 200, where it is received at the network adapter 225. A network driver (of layer 312 or layer 330) processes the packet and, if appropriate, passes it on to a network protocol and file access layer for additional processing prior to forwarding to the write-anywhere file system 360. The lock manager examines the lock state information to determine whether there is an existing lock on the file that could prevent execution of the operation associated with the access request.

If it is determined that execution of the operation is allowed, the file system generates additional operations to load (retrieve) the requested data from disk 130 if it is not resident "in core", i.e., in memory 224. If the information is not in memory, the file system 360 indexes into the inode file using the inode number to access an appropriate entry and retrieve a logical vbn. The file system then passes a message structure including the logical vbn to the RAID system 380; the logical vbn is mapped to a disk identifier and disk block number (disk,dbn) and sent to an appropriate driver (e.g., SCSI) of the disk driver system 390. The disk driver accesses the dbn from the specified disk 130 and loads the requested data block(s) in memory for processing by the node. Upon completion of the request, the node (and operating system) returns a reply to the client 180 over the network 140.

It should be noted that the software "path" through the storage operating system layers described above needed to perform data storage access for the client request received at the node may alternatively be implemented in hardware. That is, in an alternate embodiment of the invention, a storage access request data path may be implemented as logic circuitry embodied within a field programmable gate array (FPGA) or an application specific integrated circuit (ASIC). This type of hardware implementation increases the performance of the storage service provided by node 200 in response to a request issued by client 180. Moreover, in another alternate embodiment of the invention, the processing elements of adapters 225, 228 may be configured to offload some or all of the packet processing and storage access operations, respectively, from processor 222, to thereby increase the performance of the storage service provided by the node. It is expressly contemplated that the various processes, architectures and procedures described herein can be implemented in hardware, firmware or software.

As used herein, the term "storage operating system" generally refers to the computer-executable code operable on a computer to perform a storage function that manages data access and may, in the case of a node 200, implement data access semantics of a general purpose operating system. The storage operating system can also be implemented as a microkernel, an application program operating over a general-purpose operating system, such as UNIX® or Windows XP®, or as a general-purpose operating system with configurable functionality, which is configured for storage applications as described herein.

In addition, it will be understood to those skilled in the art that the invention described herein may apply to any type of special-purpose (e.g., file server, filer or storage serving appliance) or general-purpose computer, including a standalone computer or ports tion thereof, embodied as or including a storage system. Moreover, the teachings of this invention can be adapted to a variety of storage system architectures including, but not limited to, a network-attached storage environment, and a storage area network and disk assembly directly-attached to a client or host computer. The term "storage system" should therefore be taken broadly to include such arrangements in addition to any subsystems configured to perform a storage function and associated with other equipment or systems. It should be noted that while this description is written in terms of a write any where file system, the teachings of the present invention may be utilized with any suitable file system, including a write in place file system.

D. CF Protocol

In the illustrative embodiment, the storage server 365 is embodied as D-module 350 of the storage operating system 300 to service one or more volumes of array 120. In addition, the multi-protocol engine 325 is embodied as N-module 310 to (i) perform protocol termination with respect to a client issuing incoming data access request packets over the network 140, as well as (ii) redirect those data access requests to any storage server 365 of the cluster 100. Moreover, the N-module 310 and D-module 350 cooperate to provide a highly-scalable, distributed storage system architecture of the cluster 100. To that end, each module includes a cluster fabric (CF) interface module 340a,b adapted to implement intra-cluster communication among the modules, as well as D-module-to-D-module communications, for data container striping operations, for example.

The protocol layers, e.g., the NFS/CIFS layers and the iSCSI/FC layers, of the N-module 310 function as protocol servers that translate file-based and block based data access requests from clients into CF protocol messages used for communication with the D-module 350. That is, the N-module servers convert the incoming data access requests into file system primitive operations (commands) that are embedded within CF messages by the CF interface module 340 for transmission to the D-modules 350 of the cluster 100. Notably, the CF interface modules 340 cooperate to provide a single file system image across all D-modules 350 in the cluster 100. Thus, any network port of an N-module that receives a client request can access any data container within the single file system image located on any D-module 350 of the cluster.

Further to the illustrative embodiment, the N-module 310 and D-module 350 are implemented as separately-scheduled processes of storage operating system 300; however, in an alternate embodiment, the modules may be implemented as pieces of code within a single operating system process. Communication between an N-module and D-module is thus illustratively effected through the use of message passing between the N-module and D-module although, in the case of remote communication between an N-module and D-module of different nodes, such message passing occurs over the cluster switching fabric 150. A known message-passing mechanism provided by the storage operating system to transfer information between N-modules and D-modules (processes) is the Inter Process Communication (IPC) mechanism. The protocol used with the IPC mechanism is illustratively a generic file and/or block-based "agnostic" CF protocol that comprises a collection of methods/functions constituting a CF application programming interface (API). Examples of such an agnostic protocol are the SpinFS and SpinNP protocols available from Network Appliance, Inc. The SpinFS protocol is described in U.S. Pat. No. 6,671,773.

The CF interface module 340 implements the CF protocol for communicating file system command messages including novel lock state command messages described herein, among the modules of cluster 100. Communication is illustratively effected by the D-module exposing the CF API to which an N-module (or another D-module) issues calls. To that end, the CF interface module 340 is organized as a CF encoder and CF decoder. The CF encoder of, e.g., CF interface 340a on N-module 310 encapsulates a CF message as (i) a local procedure call (LPC) when communicating a file system command to a D-module 350 residing on the same node 200 or (ii) a remote procedure call (RPC) when communicating the command to a D-module residing on a remote node of the cluster 100. In either case, the CF decoder of CF interface 340b on D-module 350 de-encapsulates the CF message and processes the file system command.

FIG. 4 is a schematic block diagram illustrating the format of a CF message 400 in accordance with an embodiment of with the present invention. The CF message 400 is illustratively used for RPC communication over the switching fabric 150 between remote modules of the cluster 100; however, it should be understood that the term "CF message" may be used generally to refer to LPC and RPC communication between modules of the cluster. The CF message 400 includes a media access layer 402, an IP layer 404, a UDP layer 406, a reliable connection (RC) layer 408 and a CF protocol layer 410. As noted, the CF protocol is a generic file system protocol that conveys file system commands related to operations contained within client requests to access data containers stored on the cluster 100; the CF protocol layer 410 is that portion of message 400 that carries the file system commands, including the lock state commands. Illustratively, the CF protocol is datagram based and, as such, involves transmission of messages or "envelopes" in a reliable manner from a source (e.g., an N-module 310) to a destination (e.g., a D-module 350). The RC layer 408 implements a reliable transport protocol that is adapted to process such envelopes in accordance with a connectionless protocol, such as UDP 406.

A data container, e.g., a file, is accessed in the file system using a data container handle. FIG. 5 is a schematic block diagram illustrating the format of a data container handle 500 including a SVS ID field 502, an inode number field 504, a unique-ifier field 506, a striped flag field 508 and a striping epoch number field 510. The SVS ID field 502 contains a global identifier (within the cluster 100) of the SVS within which the data container resides. The inode number field 504 contains an inode number of an inode (within an inode file) pertaining to the data container. The unique-ifier field 506 contains a monotonically increasing number that uniquely identifies the data container handle 500. The unique-ifier is particularly useful in the case where an inode number has been deleted, reused and reassigned to a new data container. The unique-ifier distinguishes that reused inode number in a particular data container from a potentially previous use of those fields. The striped flag field 508 is illustratively a Boolean value that identifies whether the data container is striped or not. The striping epoch number field 510 indicates the appropriate striping technique for use with this data container for embodiments where the SVS utilizes differing striping techniques for different data containers. Further details about an illustrative file system organization can be found in commonly-owned U.S. Pat. No. 7,698,289, issued on Apr. 13, 2010, of Kazar, et al., for a STORAGE SYSTEM ARCHITECTURE FOR STRIPING DATA CONTAINER CONTENT ACROSS VOLUMES OF A CLUSTER, which is incorporated by reference herein in its entirety.

E. Storage System Architecture

The present invention is directed to a technique for managing lock state information in a distributed storage system architecture comprising two or more volumes distributed across a plurality of nodes 200 of cluster 100. As noted, the volumes are organized as one or more striped volume sets (SVS) and configured to store content of data containers, such as files and luns, served by the cluster in response to multi-protocol data access requests issued by clients. Each node may include a D-module adapted to service a volume of the SVS. As more particularly illustrated in FIG. 6, the SVS comprises a meta-data volume (MDV) 602 and one or more data volumes (DV), DV1 604 and DV2 606. The MDV 602 is configured to store a canonical, or definitive, copy of certain metadata, including access control lists (ACLs) and directories, associated with all data containers, e.g., files, stored on the SVS, whereas each DV is configured to store, at least, data contents of those files. The MDV and the DV cooperate (with a container attributes, volume, CAV) to provide a multi-tier caching and distribution architecture described in commonly owned U.S. Pat. No. 7,698,334, issued on Apr. 13, 2010, of Kazar et al., entitled SYSTEM AND METHOD FOR MULTI-TIERED METADATA CACHING AND DISTRIBUTION IN A CLUSTERED ENVIRONMENT, which is incorporated herein by reference in its entirety. As used herein, a D-module 350 serving (hosting) a DV is referred to herein as a "DV node" while a D-module hosting the MDV in a SVS is referred to as an "MDV node."

Figure 6:
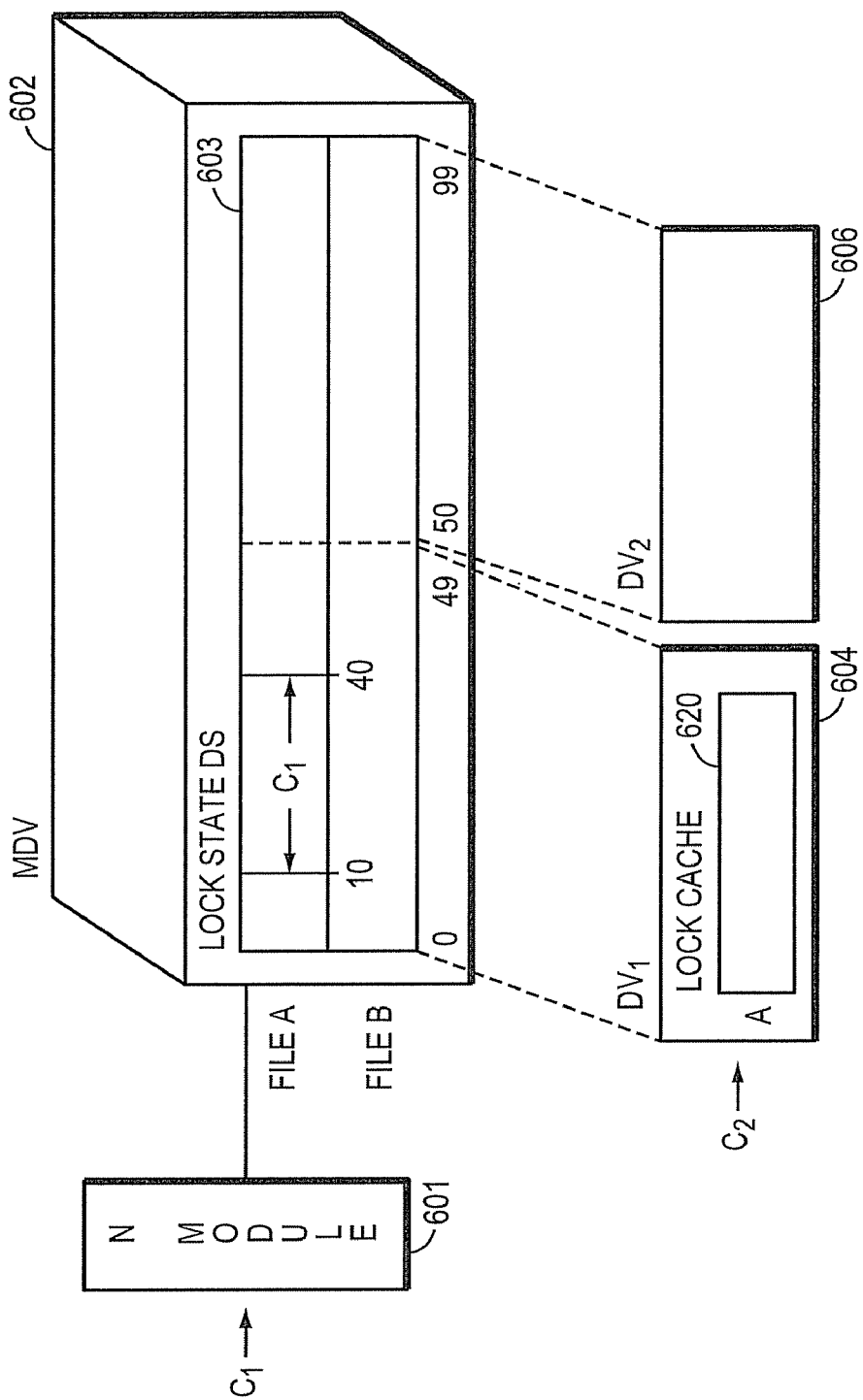
FIG. 6 is a schematic block diagram of a metadata volume (MDV) node and its association with the lock state information cached by one or more data volume (DV) nodes in accordance with an illustrative embodiment of the present invention.

FIG. 6 is a schematic block diagram illustrating an MDV node 602 and its associated lock state information cached by one or more DV nodes 604, 606 in accordance with an illustrative embodiment of the present invention. In accordance with the invention, the MDV node 602 functions as the authoritative source for all lock state information for all data containers stored on the SVS. To that end, the lock manager 362 configures and maintains a lock state database 603 on the MDV node 602 that stores the definitive lock state information for all files in the SVS. Moreover, each DV node has its own local lock cache 620 for storing any information it may have about locks on the volumes that it serves. In response to a client request for access to a file or portion of a file, the MDV node processes the request and provides the resulting lock state information to the appropriate DV node(s) for storage in the local lock cache 620.

Assume that two large files, File A and File B span both stripes exactly once in each DV node 604 and 606 such that DV1 node 604 serves/hosts the first 50 bytes (offset 1-49) for each file, and DV2 node 606 hosts the next 50 bytes (offset 50-99) for each file. The lock state database 603 in the MDV node 602 maintains all of the lock state information for the ranges embodied in Files A and B from offset 0 to offset 99.

Figure 7:
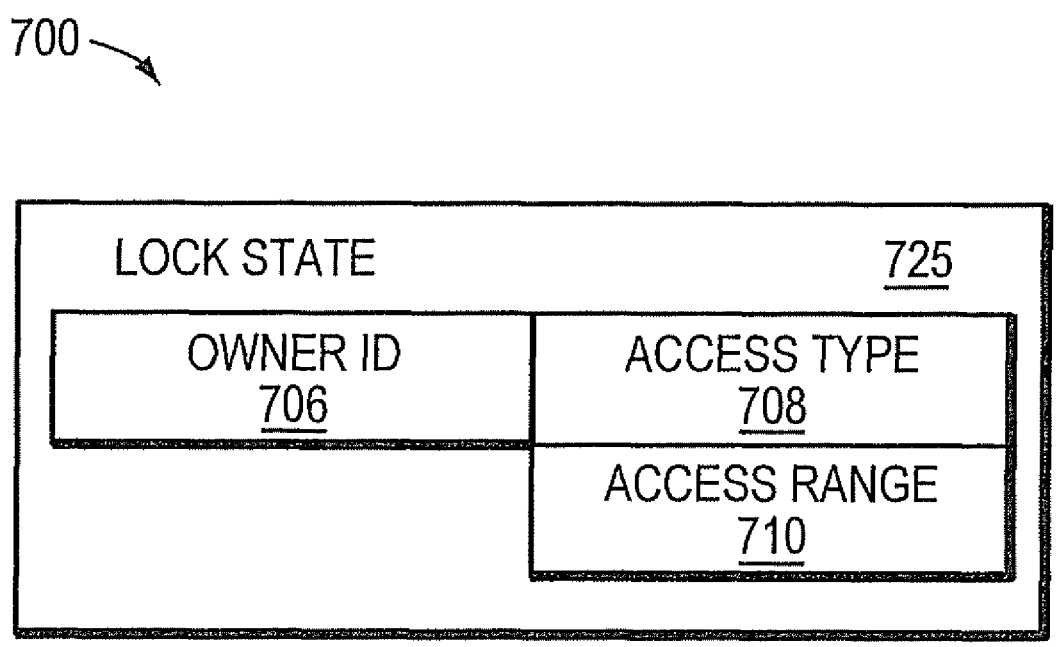
FIG. 7 illustrates one embodiment of a lock state data structure in accordance with an illustrative embodiment of the present invention.

The specific lock state information that is maintained for each file is schematically illustrated in the lock state data structure of FIG. 7. The lock state data structure 700 contains a lock state field 725 that, in turn, includes an owner identification (ID) field 706 that stores an owner ID 706 or a unique identifier of the client that is allowed to access the file. An access type field 708 stores an indication of the type of lock, which is either a read lock or a write lock. In addition, an access range field 710 is provided that is indicates the range of the file locked by the lock type.

Referring again to FIG. 6, assume further that a client C1 sends a request to the N-module 601 to obtain exclusive write access for ranges 10-40 of File A stored on the SVS. The N-module 601 directs this request to the MDV node as the authoritative source of lock state information for that SVS. The MDV node places an exclusive lock on bytes 10-40 of the File A for C1 in its lock state database 603. Assume now, that a client C2 subsequently requests write access to byte 25 of File A. The request is forwarded to the DV1 node 604, which checks its local lock cache 620 for lock state information pertaining to the file range. If lock state cache 620 is empty with respect to the file range then, in accordance with the invention, the absence of information in the cache causes the DV node to query the MDV node 602 to determine the current lock state information with respect to byte 25 of File A.

The MDV node 602 searches the authoritative lock state database 603 and responds with an indication as to whether there is a lock on the particular byte requested. If there is one or more locks, the MDV node also responds with the set of locks that is relevant to that particular request. Illustratively, the MDV node 602 responds to the DV1 node that a client has a write lock on bytes 10-40. Note that communication between the MDV and DV nodes is effected using lock state commands embedded in the CF protocol messaging described previously.

Figure 8:
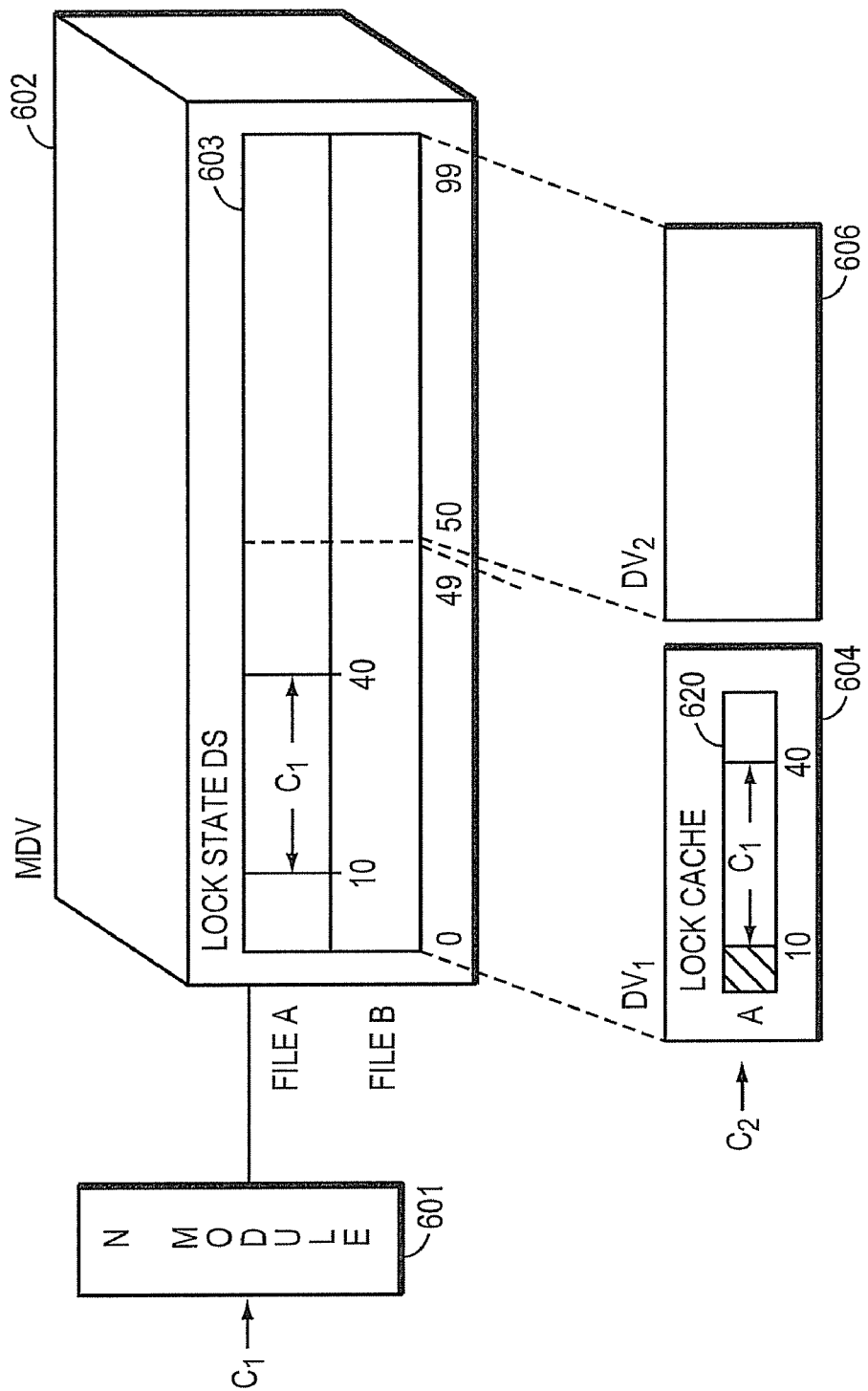
FIG. 8 is schematic block diagram of the system of FIG. 6 illustrating an update of is the local lock cache.

FIG. 8 is a schematic block diagram illustrating update of the lock cache 620 of the DV1 node with the lock state information provided by the MDV node 602. Here, the lock cache 620 of DV 1 604 is updated to indicate that there is a write lock on bytes 10-40 in File A. The DV1 node then notifies the requesting client C2, that the request is denied.

In an illustrative embodiment of the present invention, the DV nodes are notified of the lock state information by the MDV node on a request-by-request "need to know" is basis due to the large amount of lock state information which could be accumulated for the data containers stored on the SVS. However, it may be preferable in other embodiments of the invention to provide more lock state information for local storage on the lock cache of each DV node. Notably, the MDV node also keeps track of which DV nodes have been notified of lock state information. Accordingly, with respect to future requests, the MDV node has a record of lock state information which has already been provided to the DV nodes on an individual basis.

Figure 9A:
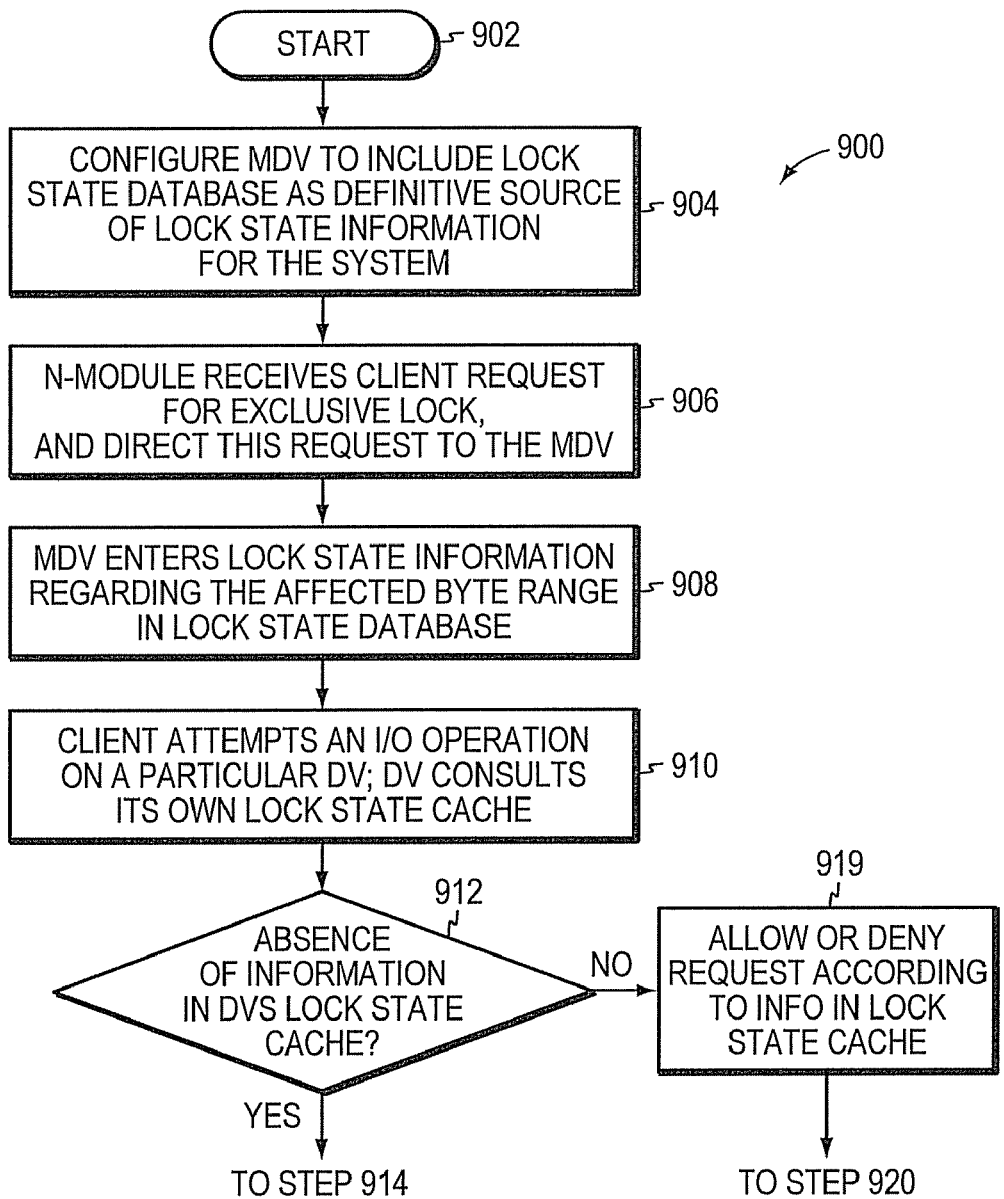
FIGS. 9A and 9B are flow charts of a procedure for managing requested locks and data access requests in accordance with an illustrative embodiment of the invention.
Figure 9B:
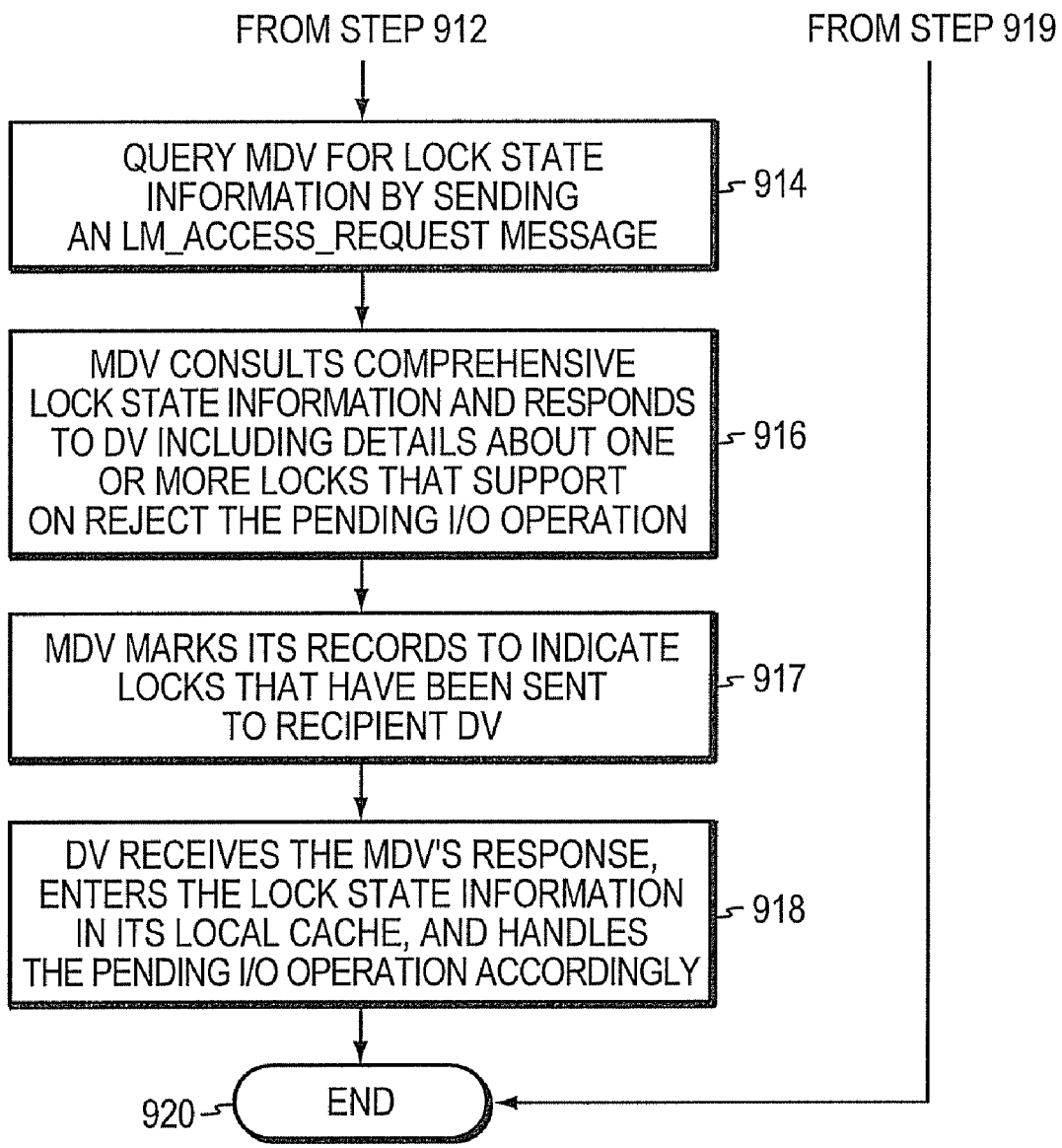

The procedure described above is summarized in the flowchart 900 of FIGS. 9A and 9B. The procedure starts at step 902 and continues to steps 904 where a lock state database is established in the MDV node as a definitive lock state information source for the SVS. In step 906, an N-module receives a request for exclusive access to a range of a file from a client. The N-module directs this request for exclusivity to the MDV node 602. Assuming there is no conflict (i.e., no existing lock to the requested file range, in step 908 the MDV node 602 enters the lock state information for the affected byte range in its lock state database 603. Subsequently, when a data access request arrives at a particular DV node via the N-module, that DV node checks its local lock cache 620 for information about any lock state that exists for the affected range (step 910). At step 912, a determination is made as to whether the lock cache 620 is empty. The absence of information in the lock state cache causes the procedure to continue to step 914 whereby the MDV node is queried for lock state information about that particular file or byte range. In step 916, the MDV node checks the lock state database and responds to the DV node with an indication as to whether the operation is allowed and with any relevant lock state information about byte ranges involved in the request. In step 917, the MDV node marks its records that the requesting DV node has been notified of particular locks. The DV node then updates its local lock cache accordingly as shown in step 918. If the local lock cache 620 of the affected DV node does contain lock state information at step 912, then the procedure continues to step 919 where the DV node checks its local lock cache information indicating whether the operation is allowed or should be rejected. The client is is notified accordingly and thereafter, the procedure ends at step 920.

Figure 10:
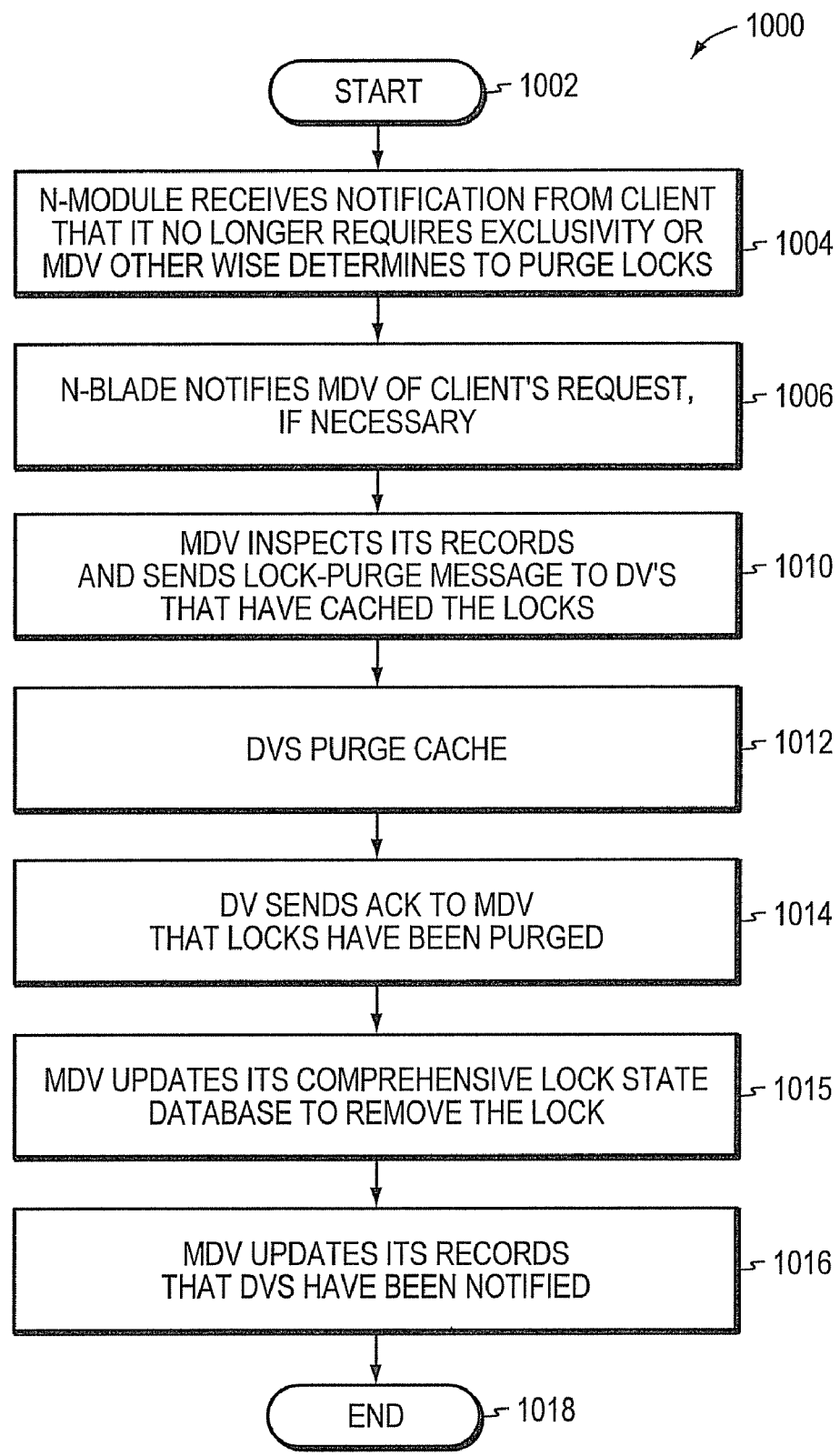
FIG. 10 is a flow chart of a procedure for purging locks in accordance with an illustrative embodiment of the invention.

During subsequent operation of the system, a particular client may determine that it no longer requires exclusivity with respect to a particular file or byte range. Thus, in accordance with the invention the procedure 1000 is followed, which is illustrated in FIG. 10. The procedure starts at step 1002 and continues to step 1004 where an N-module receives a notification from a client that it no longer requires exclusivity on a particular byte range. In step 1006, the N-module notifies the MDV node of this development. In step 1010, the MDV node thereafter checks its records to determine which DV nodes had been supplied with lock state information, and sends a lock state command, e.g., a LOCK_PURGE message, to each affected DV node to purge its local lock cache with respect to that byte range. In step 1012, the relevant DV nodes purge their lock state caches to remove the lock on that particular byte range and in step 1014, each DV node sends an acknowledgement to the MDV node that the lock has been purged. In step 1015, the MDV node updates its lock state database to remove the particular lock which had existed on that byte range. In step 1016, the MDV node updates its records that each DV node has been notified thereof and has received an acknowledgement of the removal of the locks, i.e., the lock purge. The procedure ends at step 1018.

Figure 11:
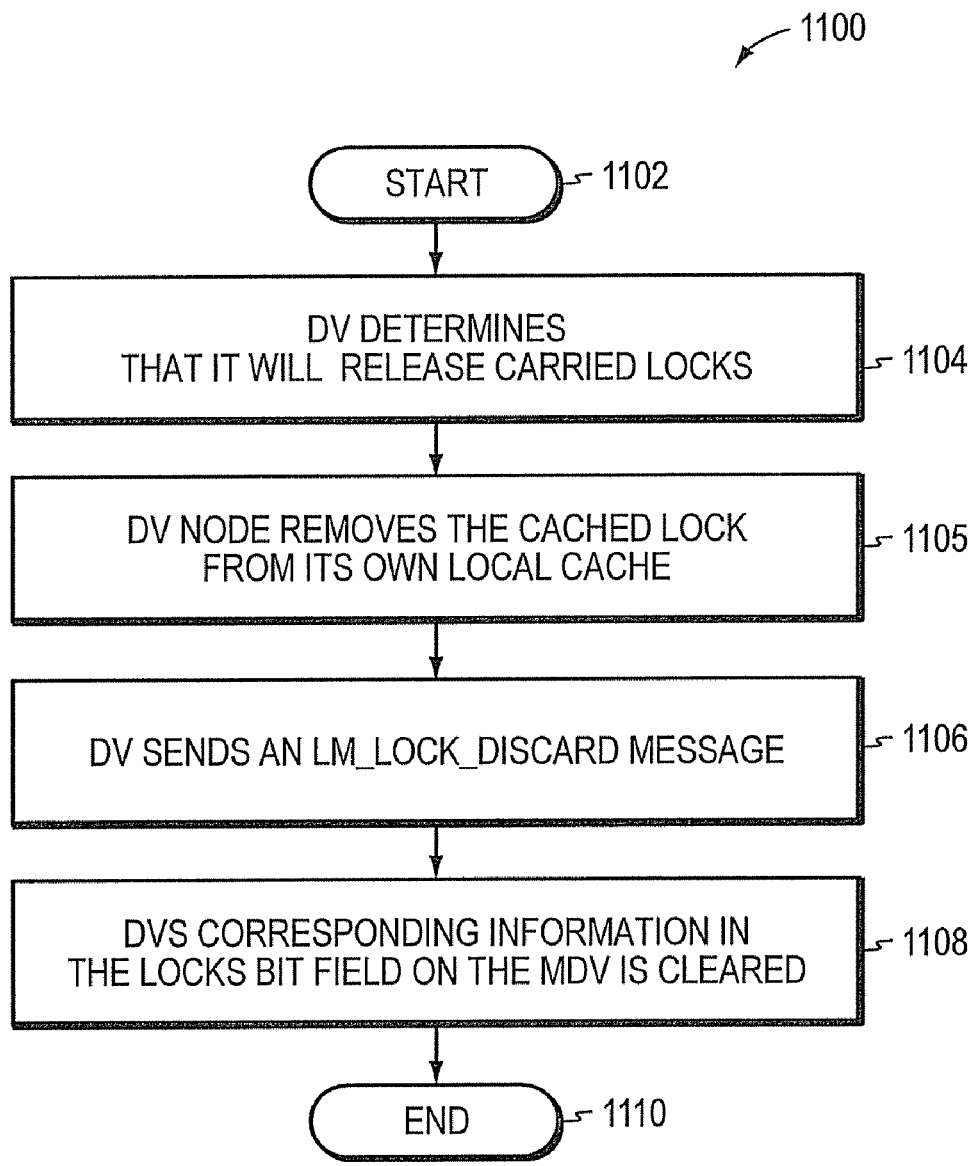
FIG. 11 is a flow chart of a procedure for discarding locks by a DV node in accordance with an illustrative embodiment of the invention.

FIG. 11 is a flow chart of a procedure for discarding locks by a DV node in accordance with the invention. In this instance, a DV node determines that it must release cached locks in response to, for example, the DV node receiving the above described LOCK_PURGE message. Alternatively, the DV node can choose to release cached locks itself particularly if, e.g., the DV node employs a fixed-size lock cache. In this case, the DV node is configured to release older locks in favor of newer ones. The procedure 1100 starts at step 1102 and proceeds to step 1104 in which a DV node determines that it will release cached locks, and thus, in accordance with step 1105, the DV node removes the corresponding lock state information from its local lock cache. In step 1106, the DV node sends another lock state command, e.g., an LM_LOCK_DISCARD message to the MDV node. In step 1108, that DV node's corresponding information in lock state field 725 in the lock state database entry 700 of the MDV node is cleared. The procedure ends at step 1110.

F. Permissive Areas

As noted, an unpopulated region in the local lock cache 620 of a DV node for a particular file's lock state implies a complete lack of information. As set forth in the procedure of FIG. 11, encountering an unpopulated region of the local cache necessitates a request to the MDV node for an authoritative response about whether an access request is permitted or denied. In the MDV lock state database 603, on the other hand, an unpopulated region in a file's lock state implies that all data access operations are permitted within that region. As such, since unpopulated regions in the MDV's lock state database are implicit statements of lock states, this information must be propagated to interested DV nodes in some manner.

In accordance with the invention, a "permissive area" is provided to propagate such implicit lock state information to the DV nodes. Permissive areas (PAs) are real locks, but with a unique property that they are dynamically generated by the MDV node when a DV node requests lock state for an unpopulated region of the MDVs lock state database 603. PAs are treated as other locks on the MDV node in that information is retained by the MDV node about which DV nodes have cached the PAs. The PAs are invalidated from such caching DV nodes when the PAs are destroyed. A permissive area is typically destroyed when a request is directed from a client to the MDV node for a hard (or soft) lock on a file that overlaps (conflicts) with the PA. From the perspective of DV nodes, PAs are illustratively indistinguishable from a normal range lock that permits a client to perform data access requests within that range of a data container (file).

In accordance with a further aspect of the invention, the full byte range of a file can be partitioned into a number of distinct ranges referred to herein as "preferred permissive areas" (PPAs). Each PPA can be designated to be of a predetermined range that is illustratively selected as a realistic configuration choice for an application. For example, the PPA may be assigned a length equal to a percentage of the total file size, or a is fixed length block size (e.g., 8K bytes), for example. Wherever possible, the MDV node generates PAs that correspond to exactly one of the preferred PA ranges. Limiting the length of PAs to the preferred range improves efficiency in that it avoids having a large number of smaller PAs that are designated and maintained by the MDV node.

In response to requests for data access activity that spans multiple preferred PAs, the MDV node returns multiple PAs instead of one large PA that spans the entire data access range. This mechanism increases the potential reuse of any given PA. When a preferred PA is unavailable due to the existence of overlapping hard or soft lock ranges, the largest possible PA within the PPAs range that satisfies the access request is assigned and returned by the MDV node such that the access ranges do not overlap. To reduce the number of outstanding PPAs that might not be utilized, the MDV node may choose to utilize a least recently used (LRU) aging scheme that allows only a fixed number of PAs to be outstanding at any one time. In such a case, the MDV node issues, illustratively, a LOCK_PURGE message for old PAs as new ones are formed.

G. Examples

Figure 12:
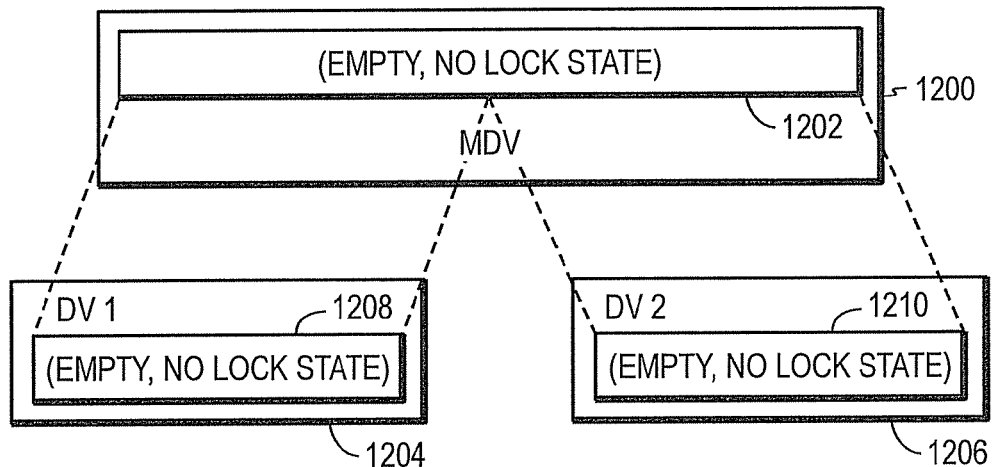
FIG. 12 is schematic block diagram of an exemplary MDV node and two DV nodes in an initial configuration in accordance with an illustrative embodiment of the present invention.

The following examples illustrate lock state interaction between DV nodes and the MDV node in a simplified system. FIG. 12 illustrates an initial configuration in which MDV node 1200 has an empty lock state database 1202, indicating the absence of a lock for a file in question. DV1 node (1204) is responsible for client data access requests directed to the first half of the file and DV2 node (1206) is responsible for such access requests directed to the second half of the file. In DV1 node, the lock cache 1208 is empty and thus contains no lock state information. Similarly, lock cache 1210 of DV2 node is also empty with no lock state information contained therein.

Figure 13:
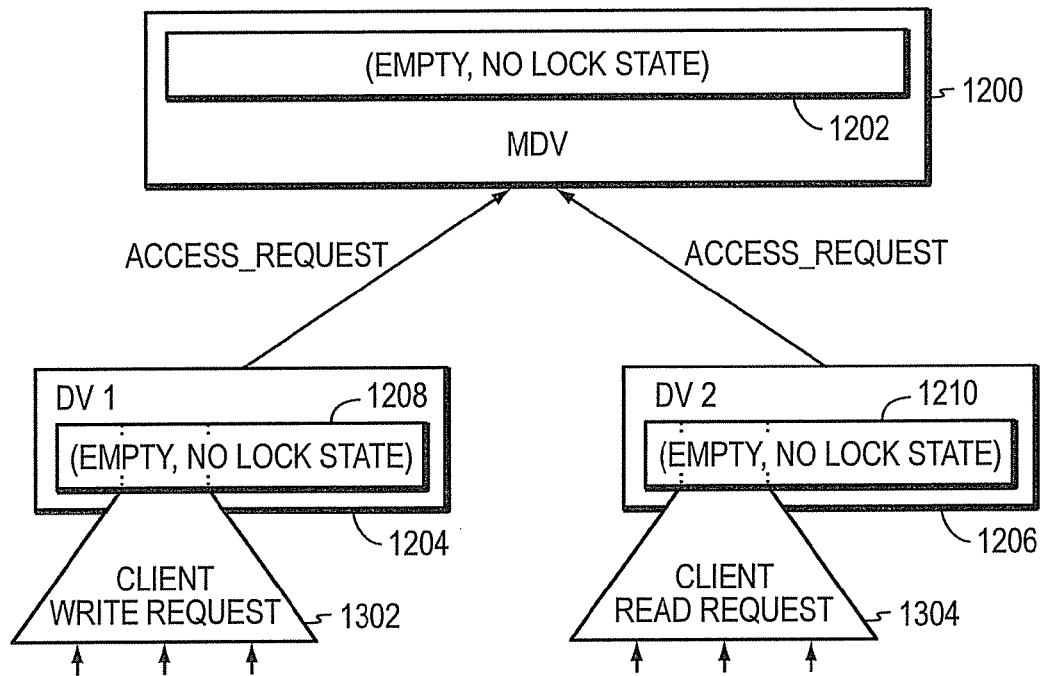
FIG. 13 is a schematic block diagram of the MDV node and DV node 1 and DV node 2, illustrating clients requesting data access operations in accordance with an illustrative embodiment of the present invention.

FIG. 13 illustrates the case in which clients attempt to access two different sections of the file. In the first instance, a client write request 1302 is received by DV1 node requesting a section of the file maintained by that node. In addition, a client read request 1304 is received by DV2 node, requesting access to a section of the file maintained by the DV2 node. Upon receiving the client write request 1302, the DV1 node consults its is local lock cache 1208 and finds no information for the range of data being targeted. Thus, the DV1 node queries the MDV node by sending another lock state command, e.g., ACCESS_REQUEST, message to the MDV node 1200 requesting lock state information for the byte range of the pending access request.

Similarly, when DV2 node receives the request, it consults its local lock cache 1210 and finds an absence of information. DV2 node thus sends an ACCESS-REQUEST message regarding the received read request 1304 to the MDV node. The MDV node 1200 receives the ACCESS_REQUEST messages from the DV1 and DV2 nodes and checks its authoritative lock state database 1202. Since no locks are present that conflict with either request, the MDV node responds that both operations can proceed. Before responding, however, and in accordance with the invention, the MDV node 1200 first creates PAs that span the empty space examined by the node. In the illustrative example, it has been predetermined that the length of a PA shall be one half of the file's length.

Figure 14:
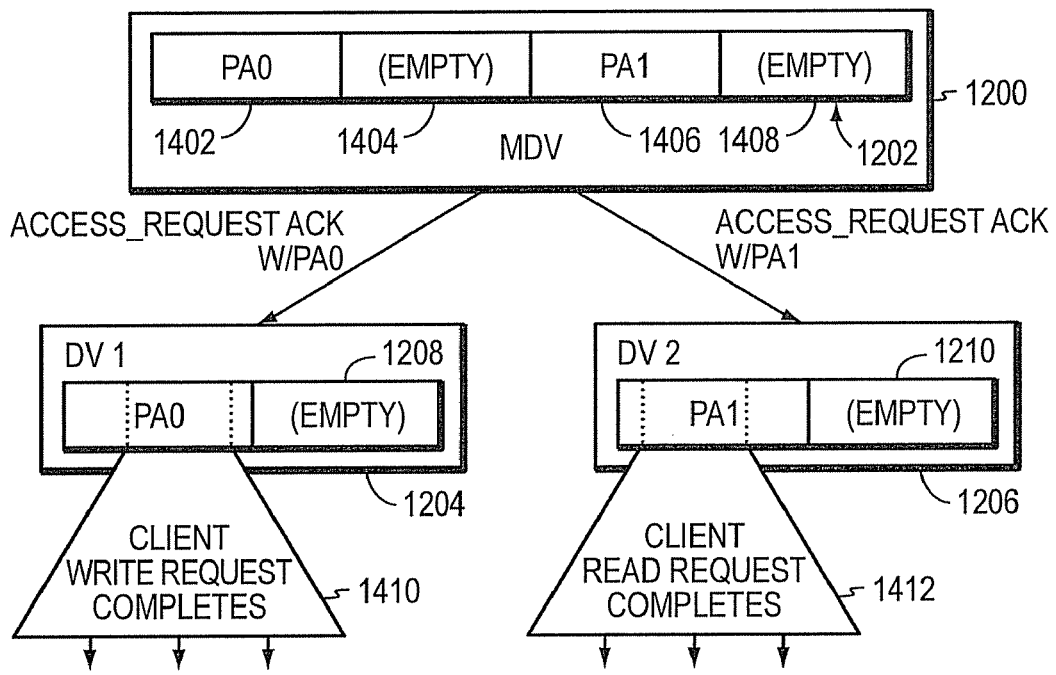
FIG. 14 is a schematic block diagram of the MDV node and DV nodes illustrating the MDV node creating permissive areas in response to the DV node requests.

FIG. 14 is a schematic block diagram illustrating the MDV node creating PAs in response to the DV node. The MDV node 1200 assigns permissive area PA0 1402 to the first half of the range of the file controlled by DV1 node. In addition, the MDV node 1200 assigns permissive area PA1 1406 to the first half of the range controlled by DV2 node. Once installed in the lock state manager database 1202, these permissive areas are returned to each requesting DV node by the MDV node. More specifically, the MDV node 1200 sends an ACCESS_REQUEST ACK w/PA0 message to DV1 node indicating that the permissive area PA0 is identified for use by DV1 node. Similarly, the MDV node 1200 sends an ACCESS_REQUEST ACK w/PA1 message to DV2 node indicating to the DV2 node that permissive area PA1 is available for serving of its request.

The DV1 and DV2 nodes then update their lock caches 1208 and 1210 and allow the pending access operations to complete. More specifically, in response to the client write request 1302 and read request 1304 (FIG. 13), the DV1 node completes the client write request 1410 and the DV2 node completes the client read request 1412, respectively.

Figure 15:
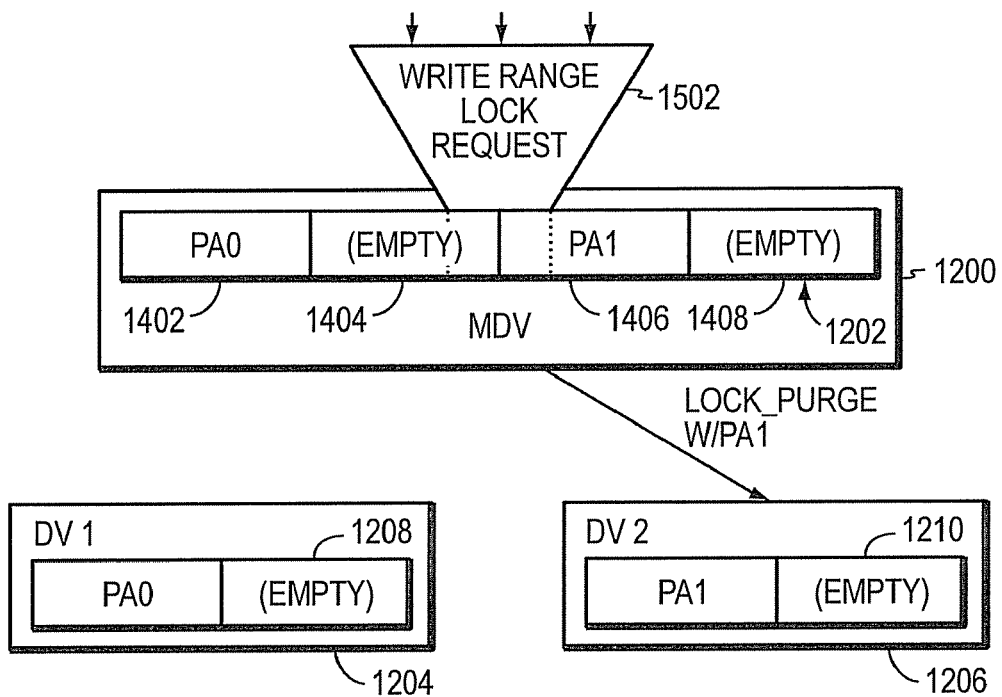
FIG. 15 is a schematic block diagram illustrating an MDV lock state database when a client requests a hard lock at the MDV node in accordance with an illustrative embodiment of the invention.
Figure 16:
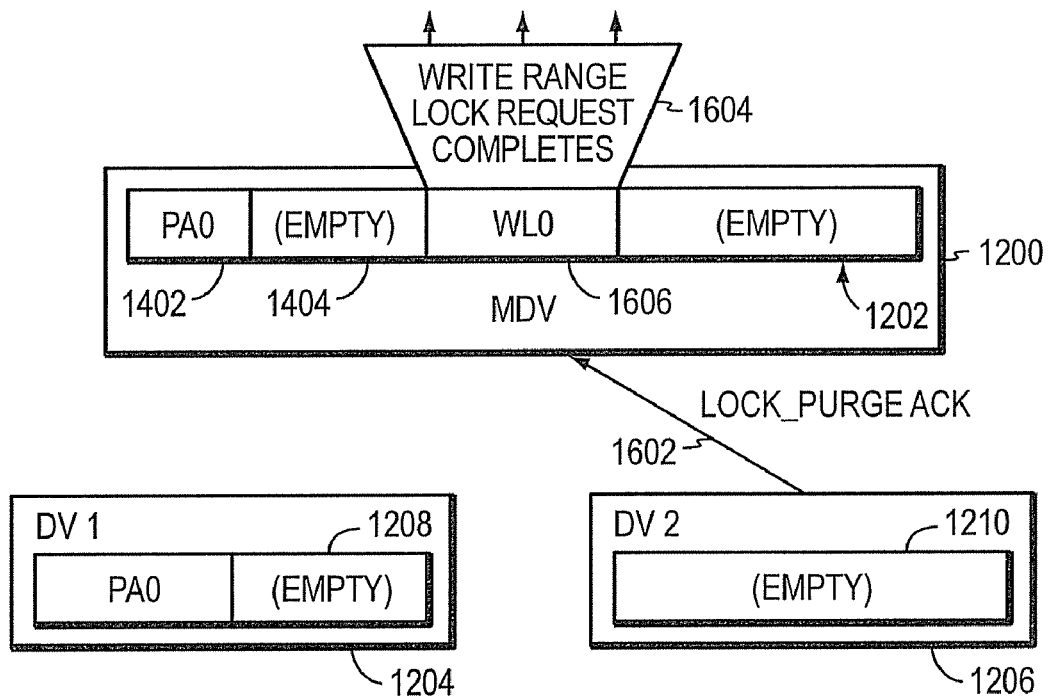
FIG. 16 is a schematic block diagram illustrating the MDV node completing the write range lock request of FIG. 15.

FIG. 15 illustrates a client requesting a hard write range lock from the MDV node 1200 in this same environment. The hard write range lock request is designated by reference character 1502 and illustratively conflicts with PA1 which had been earlier designated by the MDV node 1200. The MDV node 1200 resolves this conflict by revoking PA1 from DV2 node. Notably, PA1 is revoked because DV2 node has already performed and completed the read request (as discussed with respect to FIG. 14) and, therefore, does not need to actively utilize PA1. The DV2 node receives the invalidation of PA1 by way of a LOCK_PURGE w/PA1 lock state message issued by the MDV node 1200. DV2 node removes the lock from its local lock cache 1210 and replies with a LOCK_PURGE ACK message 1602 to the MDV node 1200, as illustrated in FIG. 16. At this point, the MDV node 1200 updates its lock state database 1202 to assign a write lock WL0 (1606) and allows the hard lock request whereby the write range lock request 1604 completes as illustrated.

Figure 17:
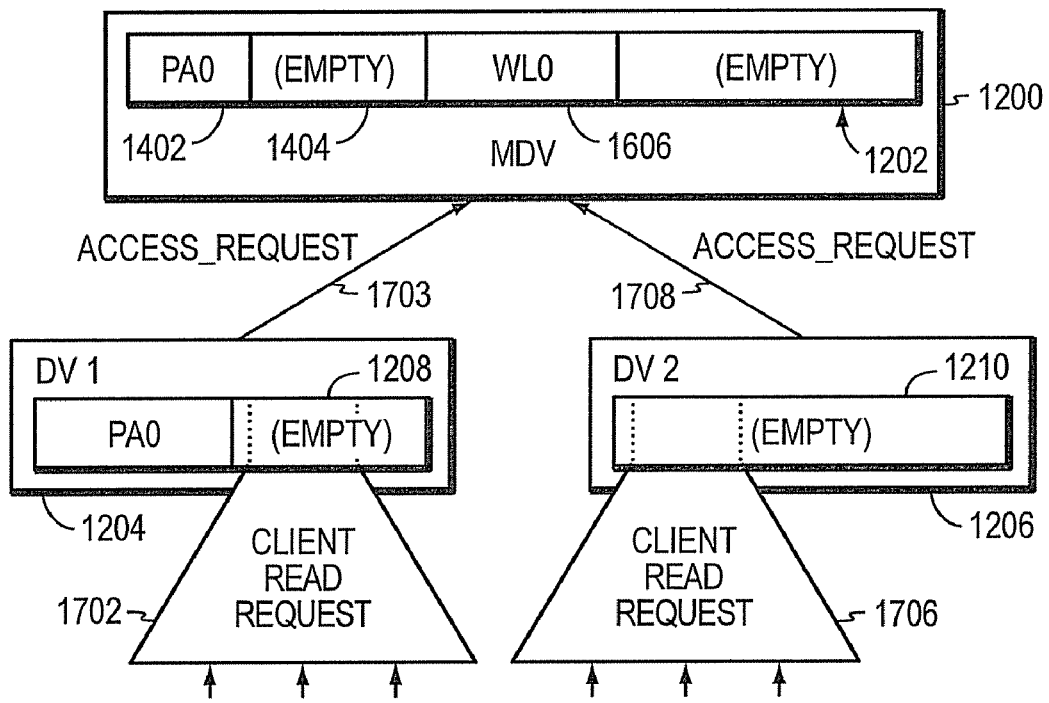
FIG. 17 is a schematic block diagram illustrating client data access requests in the presence of the write lock of FIG. 16.
Figure 18:
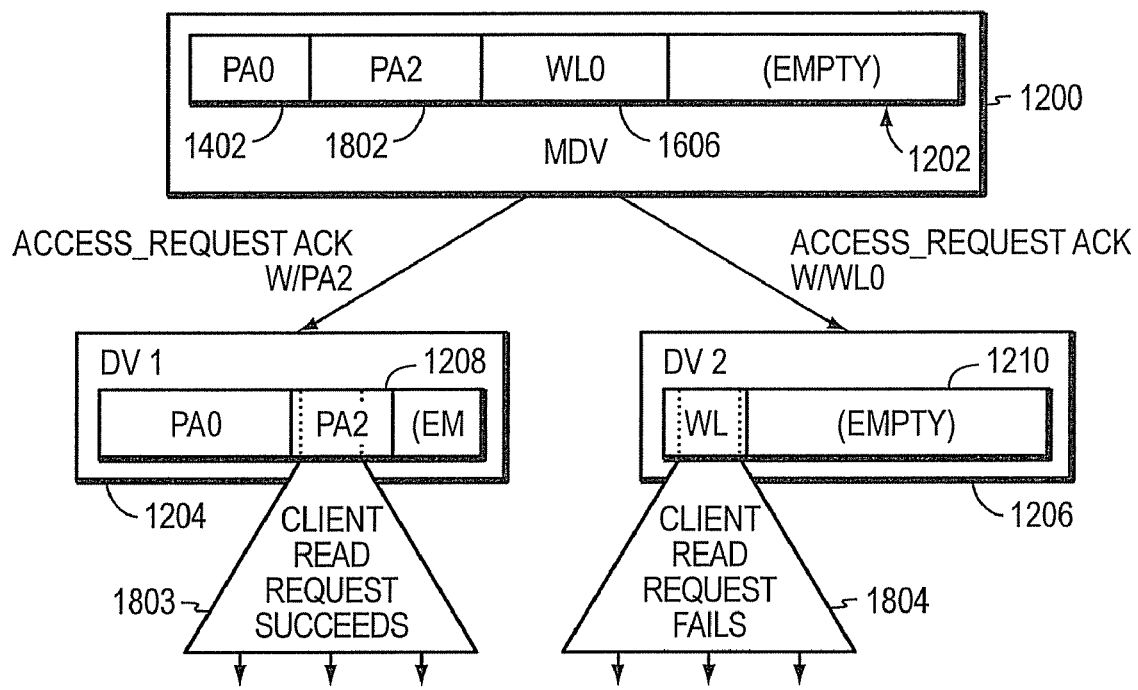
FIG. 18 is a schematic block diagram in which the MDV node responds to access requests of FIG. 17.

FIG. 17 illustrates an example of clients attempting to access the file with data access requests to the DV1 and DV2 nodes. A first client requests read access 1702 to a range that is controlled by DV1 node, which range is currently unoccupied (i.e. as illustrated in the local lock cache 1208 of DV1 node as "empty"). In response, the DV1 node sends an ACCESS_REQUEST message 1703 to the MDV node 1200. The MDV node 1200 would otherwise respond with a preferred PA, but since the area is partly occupied, it cannot assign a full preferred PA comprising one half the requested byte range. However, the MDV node 1200 constructs a smaller PA spanning the largest free area that is available. More specifically, a new PA2 1802 is established, as illustrated in FIG. 18.

In addition, a second client requests read access 1706 to a byte range controlled by the DV2 node. The DV2 node thus sends an ACCESS_REQUEST message 1708 to the MDV node 1200. Yet, since the second client has requested access to a range of the file protected by the earlier implemented write range lock WL0 (1606), the MDV node 1200 returns an ACCESS_REQUEST ACK w/WL0 message to indicate to DV2 node is that the client access is invalid. Thus, to summarize, DV1 node has a client read request which succeeds (as denoted by 1803). DV2 node has a client read request (as denoted by 1804) that has failed due to the earlier designated write range lock WL0.

Figure 19:
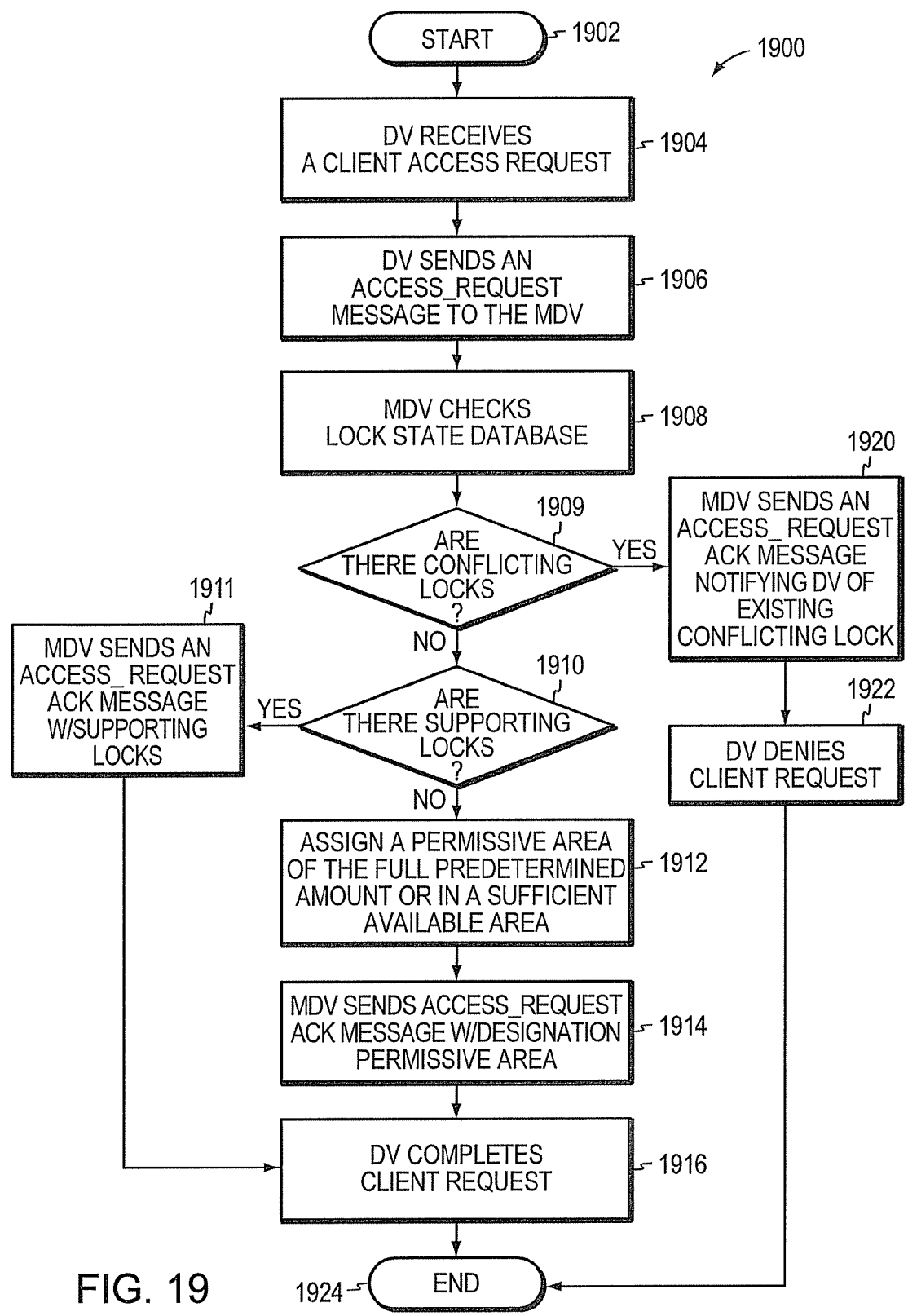
FIG. 19 is a flow chart detailing the steps of a procedure for providing lock state information in accordance with an illustrative embodiment of the present invention.

FIG. 19 is a flow chart illustrating a procedure for assigning permissive areas in accordance with the present invention. The procedure 1900 starts at step 1902 and proceeds to 1904 in which a DV node receives a client access request directed to a file or a range of a file. In step 1906, the DV node sends an ACCESS_REQUEST message to the MDV node, which checks its lock state database in step 1908. In decision step 1909, the MDV node inspects its lock state information to determine whether there are conflicting locks. If a conflicting lock exists on all or a portion of the requested range, the procedure continues to step 1920 where the MDV node sends an ACCESS_REQUEST ACK message notifying the DV node of the existing conflicting lock. In step 1922, the DV denies the client request.

If instead, the MDV node determines that there are no conflicting locks, then the procedure continues to step 1910 in which the MDV node further checks whether there are supporting locks that allow requested operation. If there are such supporting locks, then the procedure continues to step 1911 in which the MDV node sends an ACCESS_REQUEST ACK message with supporting lock information. The DV node then completes the requested operation in step 1916.

If there are no supporting locks, and in fact there are no locks at all, the procedure continues to step 1912 in which the MDV assigns a permissive area of the full predetermined amount which may be a specific range, or a smaller range, such as one half or one quarter of the file length, for example. A sufficient available range is designated as the permissive area. The permissive area so designated is then identified in an ACCESS_REQUEST ACK message sent by the MDV as in step 1914. In step 1916, the DV then completes the client request. The procedure ends at step 1924.

Figure 20:
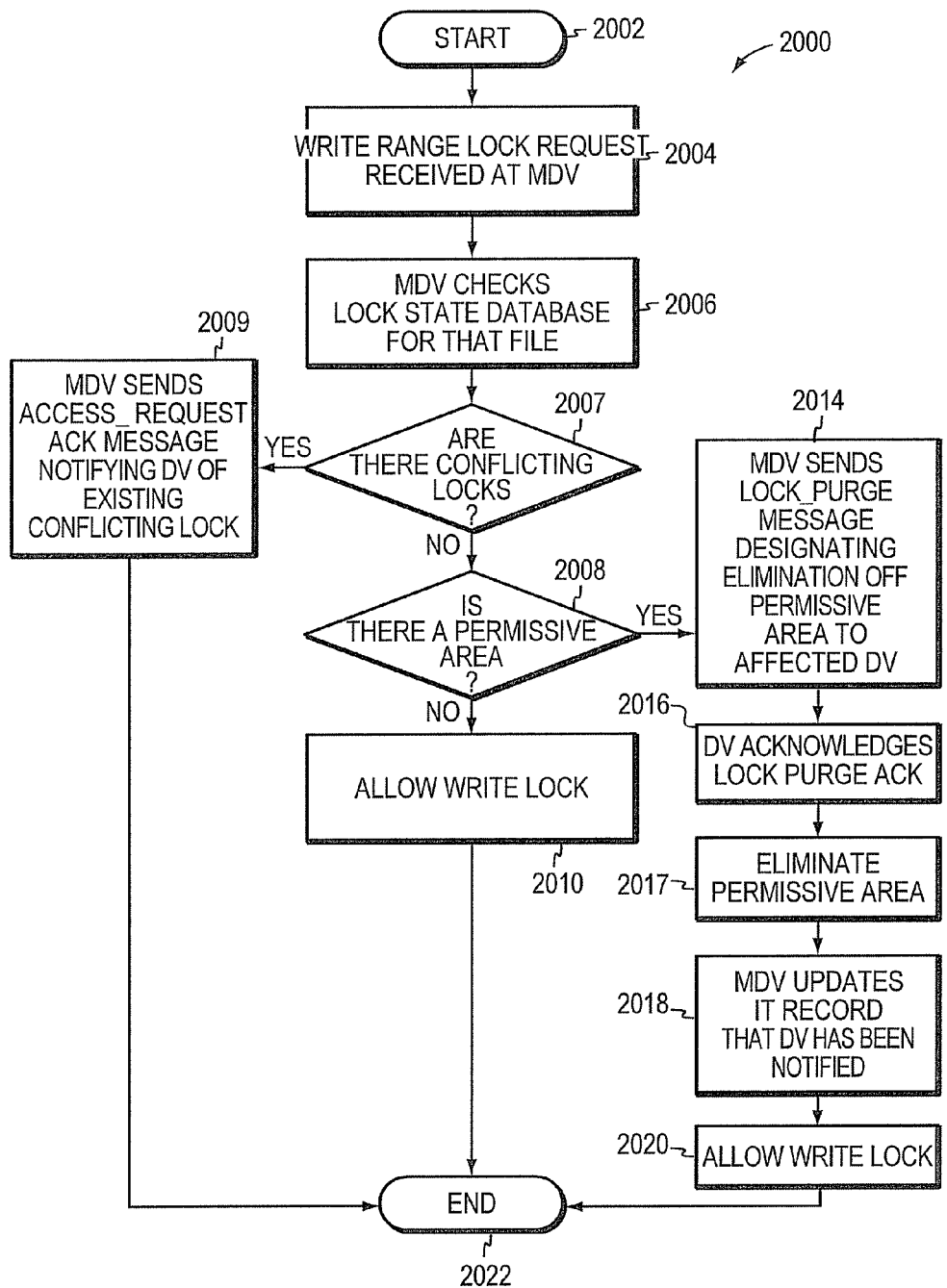
FIG. 20 is a flow chart of a procedure for purging locks in accordance with an illustrative embodiment of the invention.

FIG. 20 is a flow chart illustrating a procedure for handling a client write range is lock request for a file that is directed to the MDV node by the N-module. The procedure starts at step 2002 and proceeds to step 2004 in which a write range lock request is received at the MDV node. In response to the request, the MDV node checks its lock state database for locks with respect to that file in step 2006. More specifically, at step 2007, the MDV node determines whether there is a conflicting client-requested lock. If such a client-requested lock exists, then the procedure continues to step 2009 where the MDV node sends and ACCESS_REQUEST ACK message notifying the DV node of the existing conflicting lock (thus denying the request).

If, at the decision step 2007, the MDV node finds that there are no conflicting locks, then the procedure continues to step 2008, in which the MDV determines whether there is a permissive area already designated for the requested range. If there is not a permissive area, the MDV node allows the write lock in step 2010. If there is a permissive area already designated, then the procedure continues to step 2014 in which the MDV node sends a LOCK_PURGE message notifying the affected DV node(s) of the elimination of the permissive area. The affected DV node then acknowledges the lock purge message with a LOCK_PURGE ACK message in step 2016. Then, in step 2017, the MDV node eliminates any permissive area which had been previously designated in that range. The MDV node thereafter updates its records to indicate that the DV has been notified of the lock purge (step 2018). The write lock is then allowed at the MDV node in step 2020 and the procedure ends at step 2022.

It should be understood that the CF protocol messaging for managing lock state information illustratively described herein may be written, modified or expanded upon or written in a different software language, or in a code with different semantics or of a different format while remaining within the scope of the present invention.

In sum, the present invention described herein provides an efficient and reliable technique for managing lock state information, including hard lock state information, in a distributed storage system environment without requiring specialized software on the client. The foregoing description has been directed to particular embodiments of this invention. It will be apparent however, that other variations and modifications may be made to the described embodiments, with the attainment of some or all of their advantages. Specifically, it should be noted that the principles of the present invention may be implemented in non-distributed file systems. Furthermore, while this description has been written in terms of N and D-modules, the teachings of the present invention are equally suitable to systems where the functionality of the N and D-modules are implemented in a single system. Alternately, the functions of the N and D-modules may be distributed among any number of separate systems, wherein each system performs one or more of the functions. Additionally, the procedures, processes and/or modules described herein may be implemented in hardware, software, embodied as a computer-readable medium having program instructions, firmware, or a combination thereof. Therefore, it is the object of the appended claims to cover all such variations and modifications as come within the true spirit and scope of the invention.

What is claimed is:

1. A method for managing lock state information in a distributed file system, comprising:
   maintaining a set of data containers storing data, the data containers striped across a plurality of volumes, where each volume includes one or more data storage devices, a selected volume of the plurality of volumes maintained by a selected data volume node of the distributed file system;
   maintaining a metadata volume with the plurality of volumes, the metadata volume served by a metadata volume node of the distributed file system, the metadata volume configured to include a lock state database that stores lock state information for the plurality of volumes;
   communicating the lock state information from the metadata volume to the selected data volume node for storage in a lock state cache maintained by the selected data volume node; and
   configuring the selected data volume node to receive an access request originating is from a client, and the selected data volume node to check the lock state cache of the selected data volume to determine if the access request is permitted by entries in the lock state cache, and if there is no relevant information for the data access request in the lock state cache, sending a query from the selected data volume node to the lock state database to determine if the data access request is permitted.

2. The method as in claim 1, further comprising:
   using one or more magnetic disks as the storage devices.

3. The method as in claim 1, further comprising:
   using one or more RAID arrays of magnetic disks as the storage devices.

4. The method as in claim 1, further comprising:
   using one or more electronic random access memory devices as the storage devices.

5. The method as in claim 1, further comprising:
   using one or more optical devices as the storage devices.

6. The method as in claim 1, further comprising:
   using one or more magnetic tape devices as the storage devices.

7. The method as in claim 1, further comprising:
   using one or more bubble memory devices as the storage devices.

8. The method as in claim 1, further comprising:
   using one or more micro electro mechanical devices as the storage devices.

9. The method of claim 1, further comprising:
   using the lock state database as definitive lock state information.

10. The method of claim 1, further comprising:
    receiving a client request for an exclusive lock;
    directing the request to the metadata volume; and
    entering lock state information regarding an affected byte range into the lock state data base.

11. The method of claim 1, further comprising:
    receiving a client request for an I/O operation on a particular data volume;
    consulting the lock state cache maintained by the data volume node for appropriate lock state information;
    querying the metadata volume in the absence of the appropriate lock state information in the cache;
    consulting the lock state database by the metadata volume for the appropriate lock state information;
    responding to the data volume by the metadata volume by supporting or rejecting the client request with returned lock state information; and
    entering the returned lock state information into the data volume cache by the data volume.

12. The method as in claim 1, further comprising:
    using a file as the data container.

13. The method as in claim 1, further comprising:
    using a logical unit as the data container.

14. A distributed file system apparatus, comprising:
    a set of data containers storing data, the data containers striped across a plurality of volumes, where each volume includes one or more data storage devices, a selected volume of the plurality of volumes maintained by a selected data volume node of the distributed file system;
    a metadata volume maintained with the plurality of volumes, the metadata volume served by a metadata volume node, the metadata volume configured to include a lock state database that stores lock state information for the plurality of volumes;
    the lock state information communicated from the metadata volume to the selected data volume node for storage in a lock state cache maintained by the selected data volume node of the distributed file system; and
    the selected data volume node configured to receive an access request originating from a client, and the selected data volume node to check the lock state cache of the selected data volume to determine if the access request is permitted by entries in the lock state cache, and if there is no relevant information for the data access request in the lock state cache, sending a query by the selected data volume node to the lock state database to determine if the data access request is permitted.

15. The apparatus as in claim 14, further comprising:
    one or more magnetic disks used as the storage devices.

16. The apparatus as in claim 14, further comprising:
    one or more RAID arrays of magnetic disks used as the storage devices.

17. The apparatus as in claim 14, further comprising:
    one or more electronic random access memory devices used as the storage devices.

18. The apparatus as in claim 14, further comprising:
    one or more optical devices used as the storage devices.

19. The apparatus as in claim 14, further comprising:
    one or more magnetic tape devices used as the storage devices.

20. The apparatus as in claim 14, further comprising:
one or more bubble memory devices used as the storage devices.

21. The apparatus as in claim 14, further comprising:
one or more micro electro mechanical devices used as the storage devices.

22. The apparatus of claim 14, further comprising:
the lock state database is used as definitive lock state information.

23. The apparatus of claim 14, further comprising:
the distributed file system configured to receive a client request for an exclusive lock;
a processor configured to direct the request to the metadata volume; and
lock state information regarding an affected byte range is entered into the lock state data base.

24. The apparatus of claim 14, further comprising:
the distributed file system is configured to receive a client request for an I/O operation on a particular data volume;
an operating system of the distributed file system consults a lock state cache maintained by the data volume for appropriate lock state information;
the operating system queries the metadata volume in the absence of an appropriate lock state information in the cache;
the metadata volume consults the lock state database for the appropriate lock state information;
the operating system is configured for the metadata volume to respond to the data volume by supporting or rejecting the client request with returned lock state information; and
the returned lock state information is entered into the data volume cache by the data volume.

25. The apparatus as in claim 14, further comprising:
a file is used as the data container.

26. The apparatus as in claim 14, further comprising:
a logical unit is used as the data container.

27. A computer readable storage media, comprising:
said computer readable storage media containing instructions for execution on a processor for a method of managing lock state information in a distributed file system, the instructions for,
maintaining a set of data containers storing data, the data containers striped across a plurality of volumes, where each volume includes one or more data storage devices, a selected volume of the plurality of volumes maintained by a selected data volume node of the distributed file system;
maintaining a metadata volume with the plurality of volumes, the metadata volume served by a metadata volume node of the distributed file system, the metadata volume configured to include a lock state database that stores lock state information for the plurality of volumes;
communicating the lock state information from the metadata volume to the selected data volume node for storage in a lock state cache maintained by the selected is data volume node
configuring the selected data volume node to receive an access request originating from a client, and the selected data volume node to check the lock state cache of the selected data volume to determine if the access request is permitted by entries in the lock state cache, and if there is no relevant information for the data access request in the lock state cache, sending a query by the selected data volume node to the lock state database to determine if the data access request is permitted.

* * * * *

UNITED STATES PATENT AND TRADEMARK OFFICE
CERTIFICATE OF CORRECTION

PATENT NO.      : 8,015,355 B1                       Page 1 of 1
APPLICATION NO. : 12/535930
DATED           : September 6, 2011
INVENTOR(S)     : Toby Smith et al.

It is certified that error appears in the above-identified patent and that said Letters Patent is hereby corrected as shown below:

On the title page, please add the following:

Item (63) Continuation of application No. 11/264,831, filed on November 1, 2005 now Pat. No. 7,587,558, and related to application No. 11/591,738, filed on November 2, 2006 now Pat. No. 7,730,258.

Signed and Sealed this
Sixteenth Day of April, 2013

Teresa Stanek Rea
*Acting Director of the United States Patent and Trademark Office*